(12) United States Patent
Takahashi et al.

(10) Patent No.: US 7,679,645 B2
(45) Date of Patent: *Mar. 16, 2010

(54) IMAGE SENSING SYSTEM AND ITS CONTROL METHOD

(75) Inventors: Koji Takahashi, Kanagawa (JP); Akihisa Horiuchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 728 days.

This patent is subject to a terminal disclaimer.

(21) Appl. No.: 11/064,195

(22) Filed: Feb. 22, 2005

(65) Prior Publication Data

US 2005/0157180 A1 Jul. 21, 2005

Related U.S. Application Data

(62) Division of application No. 09/898,857, filed on Jul. 3, 2001, now Pat. No. 6,985,177.

(30) Foreign Application Priority Data

| Jul. 4, 2000 | (JP) | ............................. 2000/202619 |
| Jul. 4, 2000 | (JP) | ............................. 2000/202620 |
| Jul. 4, 2000 | (JP) | ............................. 2000/202648 |
| Nov. 17, 2000 | (JP) | ............................. 2000/351531 |

(51) Int. Cl.
*H04N 5/228* (2006.01)
*H04N 5/225* (2006.01)
*H04N 17/00* (2006.01)

(52) U.S. Cl. ................. 348/208.11; 348/187; 348/219.1

(58) Field of Classification Search ............ 348/208.99, 348/208.8, 208.11, 187, 219.1; 396/55
See application file for complete search history.

(56) References Cited

U.S. PATENT DOCUMENTS

| 4,761,685 | A |   | 8/1988 | Asida et al. |
| 5,444,481 | A |   | 8/1995 | Ohshima et al. |
| 5,596,366 | A |   | 1/1997 | Takashima et al. |
| 5,600,496 | A |   | 2/1997 | Mori |
| 5,771,403 | A | * | 6/1998 | Imada .......................... 396/52 |

(Continued)

FOREIGN PATENT DOCUMENTS

JP 61-288686 A 12/1986

(Continued)

OTHER PUBLICATIONS

The above references were cited in a Jul. 8, 2005 US Office Action that issued in related U.S. Appl. No. 09/898,857.

(Continued)

*Primary Examiner*—Nhan T Tran
(74) *Attorney, Agent, or Firm*—Cowan, Liebowitz & Latman, P.C.

(57) ABSTRACT

In an image sensing system having an image sensing optical system, and an image sensing element for photoelectrically converting incoming light from the image sensing optical system, a predetermined pattern image for adjustment, which is specified in advance, is read by the image sensing element, and the image sensing element is driven to adjust its position on the basis of an output from said image sensing element, thereby adjusting the relative position of the image sensing element with respect to the image sensing optical system prior to an image sensing operation.

13 Claims, 24 Drawing Sheets

U.S. PATENT DOCUMENTS

| | | | |
|---|---|---|---|
| 5,805,218 | A | 9/1998 | Ohura et al. |
| 5,861,915 | A * | 1/1999 | Sato et al. ............... 348/208.2 |
| 6,046,770 | A | 4/2000 | Uemura et al. |
| 6,268,885 | B1 | 7/2001 | Ohta |
| 6,424,433 | B1 | 7/2002 | Miyauchi et al. |
| 6,445,416 | B1 | 9/2002 | Kyuma et al. |
| 6,665,097 | B1 | 12/2003 | Inagaki |
| 6,686,954 | B1 * | 2/2004 | Kitaguchi et al. ........ 348/208.1 |
| 6,687,458 | B2 | 2/2004 | Masuda |
| 2001/0045989 | A1 * | 11/2001 | Onuki ........................ 348/345 |

FOREIGN PATENT DOCUMENTS

| | | |
|---|---|---|
| JP | A 3-159377 | 7/1991 |
| JP | 03-259668 A | 11/1991 |
| JP | 04-196878 A | 7/1992 |
| JP | 06-153212 A | 5/1994 |
| JP | A 8-190113 | 7/1996 |
| JP | 09-033793 A | 2/1997 |
| JP | 09-304678 A | 11/1997 |
| JP | 2000-221557 A | 8/2000 |

OTHER PUBLICATIONS

The above references were cited in a Sep. 15, 2009 Japanese Office Action that issued in Japanese Patent Application No. 2000-351531, without English Translation.

The above references were cited in a Nov. 24, 2009 Japanese Office Action which is enclosed without English Translation, that issued in Japanese Patent Application No. 2000-202620.

The above references were cited in a Dec. 15, 2009 Japanese Office Action of the counterpart Japanese Patent Application No. JP2000-351531, which is enclosed without translation.

* cited by examiner

FIG. 12

| PARAMETER | | LENS VALUE | CAMERA VALUE |
|---|---|---|---|
| X-AXIS ERROR | ANGLE | O1 | C1 |
| | SHIFT | O2 | C2 |
| Y-AXIS ERROR | ANGLE | O3 | C3 |
| | SHIFT | O4 | C4 |

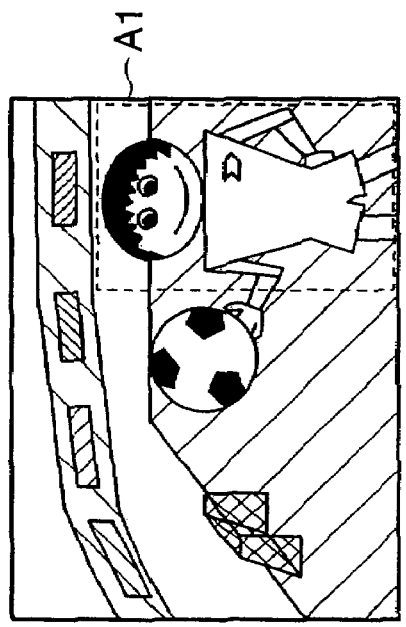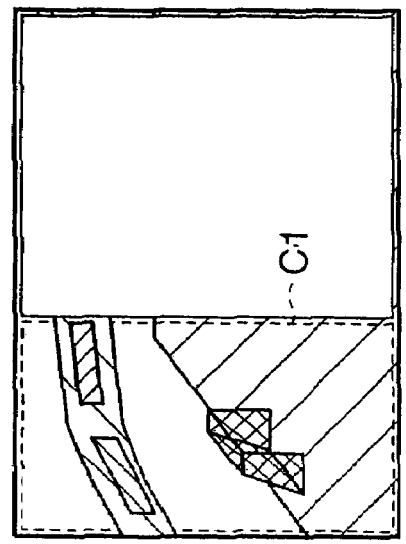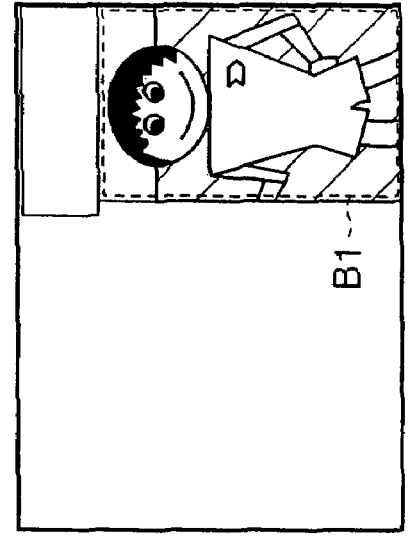

--PRIOR ART--

--PRIOR ART--

IMAGE SENSING SYSTEM AND ITS CONTROL METHOD

This application is a divisional of prior application Ser. No. 09/898,857, filed Jul. 3, 2001 now U.S. Pat. No. 6,985,177, to which priority under 35 U.S.C. §120 is claimed. This application claims the benefit of priority based on Japanese Patent Application No. 2000-202619, filed Jul. 4, 2000; No. 2000-202620, filed Jul. 4, 2000; No. 2000-202648, filed Jul. 4, 2000; and 2000-351531, filed Nov. 17, 2000, each of which is hereby incorporated by reference herein in its entirety as if fully set forth herein.

FIELD OF THE INVENTION

The present invention relates to an electrical image sensing system using an image sensing optical system and an image sensing element such as a photoelectric conversion element and its control method and, more particularly, to an image sensing system that can adjust the relative state between the image sensing optical system and image sensing element and its control method.

BACKGROUND OF THE INVENTION

FIG. 23 shows a typical arrangement of a conventional image sensing system, and the operation of the conventional image sensing system will be briefly explained below with reference to FIG. 23. In this image sensing system, an object image is formed on an image sensing element 1 by an image sensing optical system 8, which has a focal length adjustment optical system L1 for adjusting the image sensing field angle, a correction optical system L2 for making correction corresponding to the movement of the optical system L1, a shift optical system L3 for camera-shake correction, an iris mechanism (Iris) for adjusting the amount of incoming light, and a focal point position adjustment optical system L4 for making focus adjustment. The image sensing element 1 photoelectrically converts the object image into an electrical signal, and a signal processor 3 processes the electrical signal to obtain a color video signal. The color video signal is output, and its luminance information is mainly supplied to an exposure control (AE) unit 4 and focus adjustment (AF) unit 2, thus generating respective control signals (see Japanese Patent Laid-Open Nos. 3-159377 and 8-190113).

The AE unit 4 controls the accumulation time (so-called shutter speed) of the image sensing element 1 for each frame, and the iris mechanism Iris, and the AF unit 2 controls the focal point position adjustment optical system L4.

A vibration sensor 7 comprises an acceleration sensor and the like, and detects any camera shake. A shift optical system driving (AS/IS) unit 6 reduces blur of an object image caused by camera shake by driving the shift optical system L3 using the detection output of the vibration sensor 7.

A field angle adjustment (zoom) unit 5 receives an operation instruction signal for adjusting the image sensing field angle in accordance with a user's request, reads out a digital cam curve from a memory (not shown), and controls the focal length adjustment optical system L1, correction optical system L2, and focal point position adjustment optical system L4 in cooperation with each other.

As described above, in recent years, along with a rapid size reduction of the image sensing system, a multi-function, high-performance, compact image sensing system can be realized. For example, Japanese Patent Laid-Open No. 3-159377 discloses contents associated with an electric tilt & shift control mechanism and multi-point AF evaluation. However, the image sensing element requires very high attachment precision.

For example, as shown in FIG. 24, an angle θ the optical axis of the image sensing optical system 8 makes with the image sensing element 1 often tilts from the vertical or horizontal position due to poor manufacturing precision of parts, attachment errors in the manufacturing process, and the like. In such case, as the system size becomes smaller, it becomes harder to make the angle θ fall within an allowable range, and it becomes difficult to adjust the angle at high precision that matches the current size reduction requirement.

Furthermore, as the image sensing element is down-sized, the focal length of the image sensing optical system becomes shorter, and the depth of field tends to become deeper. As a result, it becomes difficult to use a photographing technique that controls the depth of field (e.g., a shallow depth of field is set to make the background out of focus).

SUMMARY OF THE INVENTION

The present invention has been made in consideration of the above situation, and has as its object to provide an image sensing system which can easily and accurately attain automatic adjustment of the relative position (angle) of an image sensing element within a predetermined allowable range with respect to an image sensing optical system by setting of an operation instruction (parameter) by the operator, and can sufficiently cope with a further size reduction of the apparatus arrangement, and its control method.

It is another object of the present invention to suppress deterioration of image quality due to tilt of an image sensing element in an image sensing apparatus having a field angle adjustment function.

According to the present invention, the foregoing object is attained by providing an image sensing system comprising: an image sensing element for photoelectrically converting incoming light from an image sensing optical system; and an adjuster for adjusting a position of the image sensing element as an initial operation for an image sensing operation, wherein the adjuster adjusts a relative position of the image sensing element with respect to the image sensing optical system by reading an adjustment pattern image using the image sensing element, and driving to adjust the position of the image sensing element on the basis of an output from the image sensing element.

According to the present invention, the foregoing object is also attained by providing an image sensing system comprising: an image sensing element for photoelectrically converting incoming light from an image sensing optical system; an optical member which is inserted before the image sensing element to independently adjust optical path lengths in horizontal and vertical directions; and an adjuster for adjusting an optical path of an optical image that enters the image sensing element by controlling the optical member prior to an image sensing operation, wherein the adjuster reads an adjustment pattern image using the image sensing element, and adjusts the optical member to optimize a high frequency component of a signal output from the image sensing element.

Further, the foregoing object is also attained by providing a method of controlling an image sensing system which comprises an image sensing element for processing incoming light from an image sensing optical system, comprising: an input step of reading an adjustment pattern image using the image sensing element as an initial operation for an image sensing operation; and a position adjustment step of adjusting a relative position of the image sensing element with respect to the image sensing optical system by driving to adjust a position of the image sensing element on the basis of an output from the image sensing element.

Furthermore, the foregoing object is also attained by providing a method of controlling an image sensing system which comprises an image sensing element for processing incoming light from an image sensing optical system, and an optical member which is inserted before the image sensing element to independently adjust optical path lengths in horizontal and vertical directions, comprising: an input step of reading an adjustment pattern image using the image sensing element prior to an image sensing operation; and an adjustment step of the optical member to optimize a high frequency component of a signal output from the image sensing element.

Further, the foregoing object is also attained by providing an image sensing system comprising: an image sensing element for photoelectrically converting incoming light from an image sensing optical system; a memory for storing information that pertains to a relative position between the image sensing element and the image sensing optical system; and an adjuster for adjusting a position of the image sensing element, wherein the adjuster drives based on the information read out from the memory to adjust the relative position of the image sensing element with respect to the image sensing optical system.

Further, the foregoing object is also attained by providing a method of controlling an image sensing system which comprises an image sensing element for photoelectrically converting incoming light from an image sensing optical system, wherein information that pertains to a relative position of the image sensing element with respect to the image sensing optical system is stored, and a position adjuster is controlled to adjust the relative position of the image sensing element with respect to the image sensing optical system on the basis of the information.

Further, the foregoing object is also attained by providing an image sensing system comprising: an image sensing element for photoelectrically converting incoming light from an image sensing optical system; and an adjuster for adjusting a relative state between the image sensing optical system and the image sensing element on the basis of an operator's operation instruction.

Further, the foregoing object is also attained by providing an image sensing optical system which is detachably attached to an image sensing apparatus having an image sensing element, comprising: a plurality of lenses; and a memory that stores an adjustment amount used to correct a tilt of an optical axis of the image sensing optical system with respect to a reference plane to have a predetermined relative state.

Further, the foregoing object is also attained by providing an image sensing apparatus to which an image sensing optical system is detachably attached, comprising: an image sensing element for photoelectrically converting incoming light from the image sensing optical system; and an adjuster for adjusting a relative state between the image sensing optical system and the image sensing element on the basis of an operator's operation instruction.

Further, the foregoing object is also attained by providing a method of controlling an image sensing system having an image sensing element for photoelectrically converting incoming light from an image sensing optical system, wherein a relative state between the image sensing optical system and the image sensing element is adjusted on the basis of an operator's operation instruction.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 shows an error table in the image sensing system according to the fourth embodiment of the present invention;

FIGS. 20A to 20C show a method of setting in-focus and non-in-focus regions according to the seventh embodiment;

DETAILED DESCRIPTION OF THE PREFERRED EMBODIMENTS

Preferred embodiments of the present invention will be described in detail in accordance with the accompanying drawings.

First Embodiment

Figure 1:
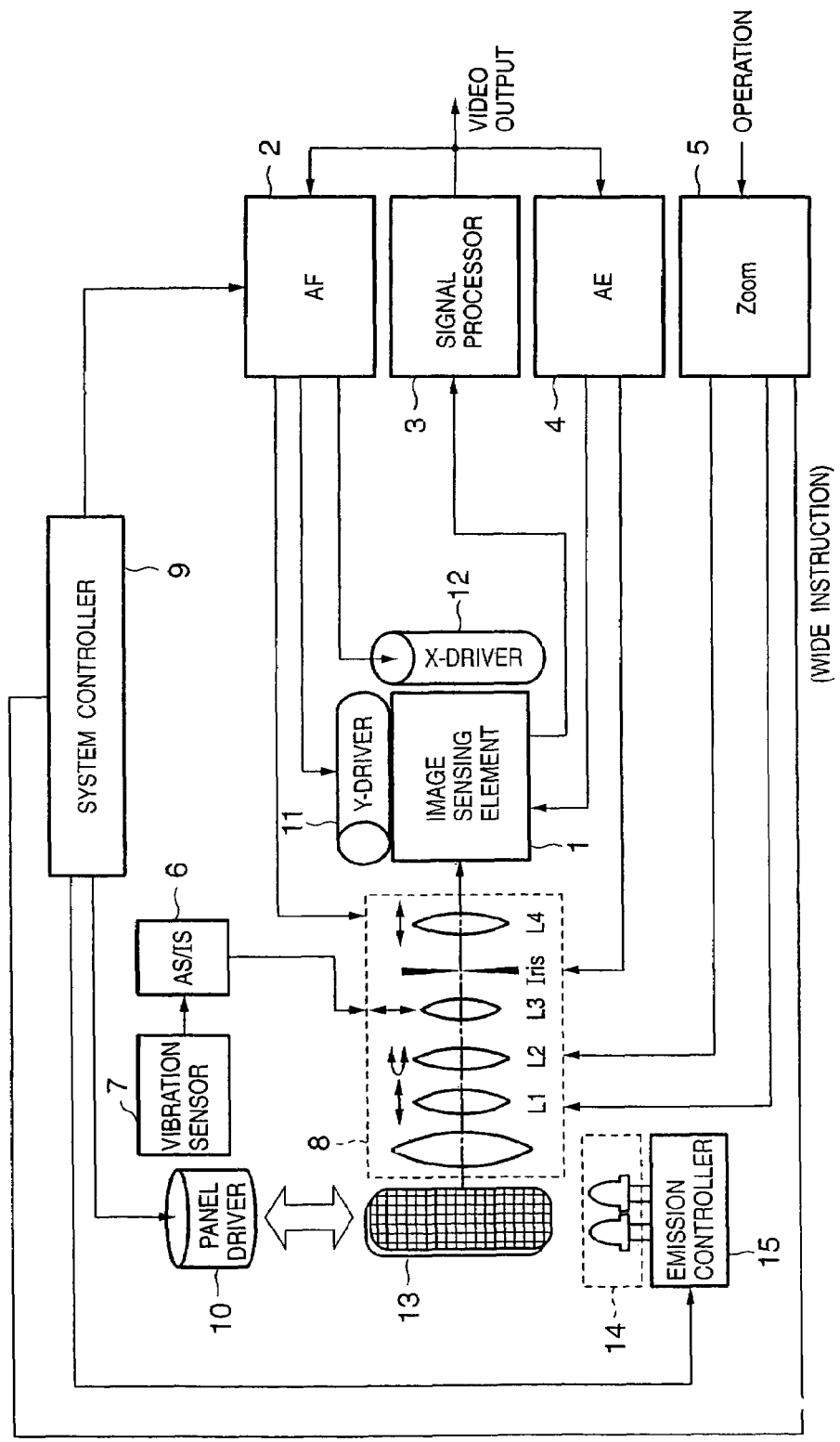
FIG. 1 is a block diagram showing the overall arrangement of an image sensing system according to the first embodiment of the present invention.

FIG. 1 is a block diagram showing the overall arrangement of an image sensing system according to the first embodiment of the present invention.

In this image sensing system, reference numeral 1 denotes an image sensing element which comprises a photoelectric conversion element such as a CCD, CMOS, or the like; and 8, an image sensing optical system which has a focal length adjustment optical system L1 for adjusting the image sensing field angle, a correction optical system L2 for making correction corresponding to the movement of the optical system L1, a shift optical system L3 for camera-shake correction, an iris mechanism (Iris) for adjusting the amount of incoming light, and a focal point position adjustment optical system L4 for making focus adjustment.

Furthermore, reference numeral 2 denotes a focus adjustment (AF) unit for controlling the focal point position adjustment optical system L4; 3, a signal processor for receiving a sensed image signal from the image sensing element 1, and outputting an image; 4, an exposure control (AE) unit for controlling the accumulation time (so-called shutter speed) of the image sensing element 1 for each frame, and the iris mechanism Iris; and 5, a field angle adjustment (zoom) unit, which receives an operation instruction signal for adjusting the image sensing field angle in accordance with a user's request, reads out a digital cam curve from a memory (not shown), and controls the focal length adjustment optical system L1, correction optical system L2, and focal point position adjustment optical system L4 in cooperation with each other.

Reference numeral 7 denotes a vibration sensor which comprises an acceleration sensor and the like, and detects any camera shake; and 6, a shift optical system driving (AS/IS) unit for reducing blur in an object image caused by camera shake by driving the shift optical system L3 upon receiving the signal from the vibration sensor 7.

Reference numerals 12 and 11 denote drivers which respectively pivot the image sensing element 1 about the X- and Y-axes, and can use, e.g., a stepping motor, voice coil motor, or an actuator such as a piezoelectric element or the like.

Reference numeral 13 denotes a panel formed with a test chart; 10, a panel driver for moving the panel 13; 14, an illumination unit for illuminating the test chart on the panel 13; and 15, an emission controller for controlling to drive the illumination unit 14.

The test chart includes various frequency components ranging from low frequency components with a large pattern spacing to high frequency components with a small pattern spacing. The illumination unit 14 can select a plurality of wavelengths ranging from a reddish color having a long wavelength to a bluish color having a short wavelength. A white light source may be used.

A system controller 9 controls the AF unit 2, panel driver 10, and emission controller 15.

A characteristic feature of the image sensing system according to the first embodiment of the present invention lies in that the relative position (angle) of the image sensing element 1 with respect to the optical system 8 is initially adjusted prior to steady control of the image sensing optical system 8 and its various parameters on the basis of control data from the respective processors (AF unit 2, AE unit 4, AS/IS 6, zoom unit 5, and Iris).

Figure 2:
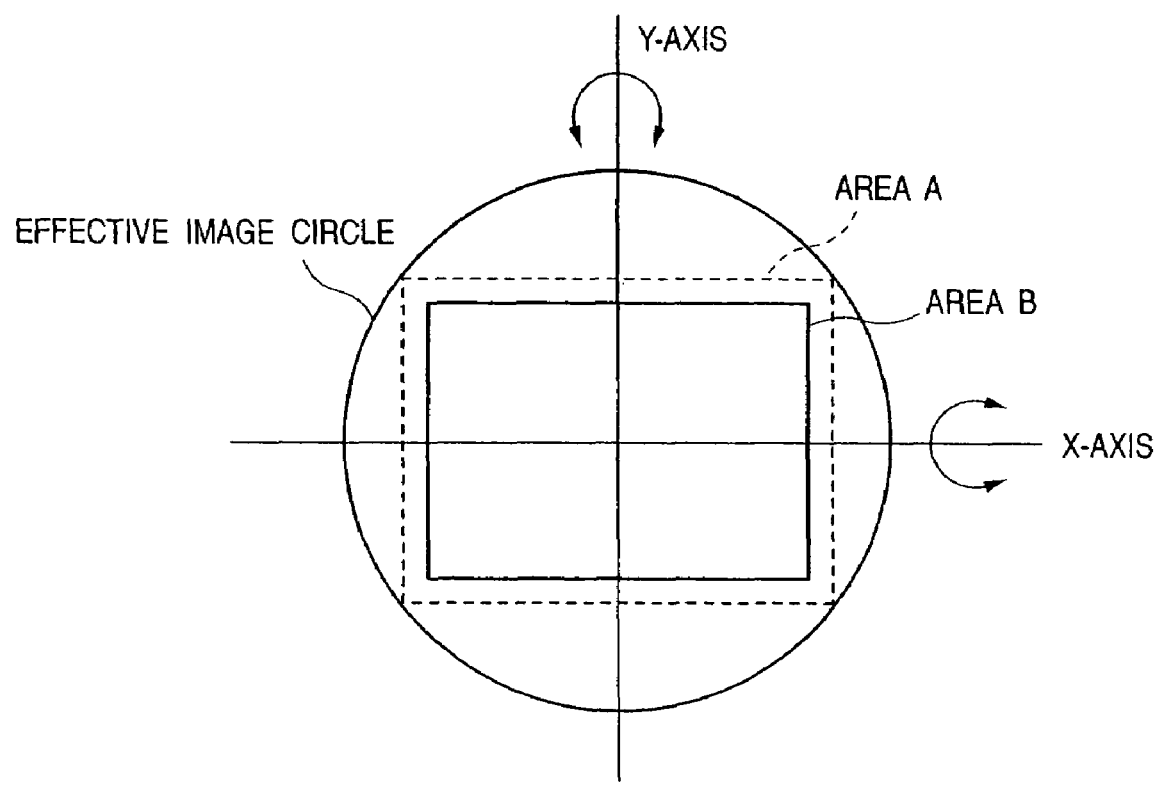
FIG. 2 shows the basic concept of angle adjustment.

FIG. 2 shows the basic concept of an image sensing region when the image sensing element 1 undergoes angle adjustment.

The angle adjustment must be done for the image sensing frame about the X- and Y-axes. An inscribed maximum rectangular image sensing area in an effective image circle that includes an effective image formed by the image sensing optical system 8 is area A, and an eclipse-free safe area that takes the angle adjustment of the image sensing element 1 about the two axes is area B. In this case, an image signal is generated and output using as area B an effective image sensing area obtained by adjusting an angle θ (θx, θy) the optical axis of the image sensing optical system 8 makes with the image sensing element 1 with respect to the X- and Y-axes.

A method of determining and storing the initial state of the image sensing element 1 will be described below.

In order to measure any tilt of the image sensing element 1, the panel 13 with the measurement test chart having frequency components in the X- and Y-axis directions is read. The panel 13 is located in front of the image sensing optical system 8, and can also serve as a lens protection barrier depending on the design. When the test pattern is set at a very near distance position in this way, the system controller 9 issues a movement instruction toward the wide-angle end to the zoom unit 5 to allow photographing at the closest focal length position.

The emission controller 15 controls the illumination unit 14 to emit light in synchronism with the panel driving timing of the panel driver 10. The test pattern reflects that illumination light, and reflected light forms an image on the image sensing element 1 via the image sensing optical system 8. Image data obtained by the image sensing element 1 undergoes a predetermined signal process by the signal processor 3, thus outputting a color video signal.

The frequency components of the test pattern obtained from the signal processor 3 are analyzed by the AF and AE units 2 and 3 as processors on the output side, thus making correction and adjustment.

The high frequency components of luminance signal information are mainly used by the AF unit 2, which controls the drivers 11 and 12 in accordance with the high frequency component values associated with the X- and Y-axes, thereby adjusting to maximize the intra-frame integrated value of the high frequency components.

Figure 3:
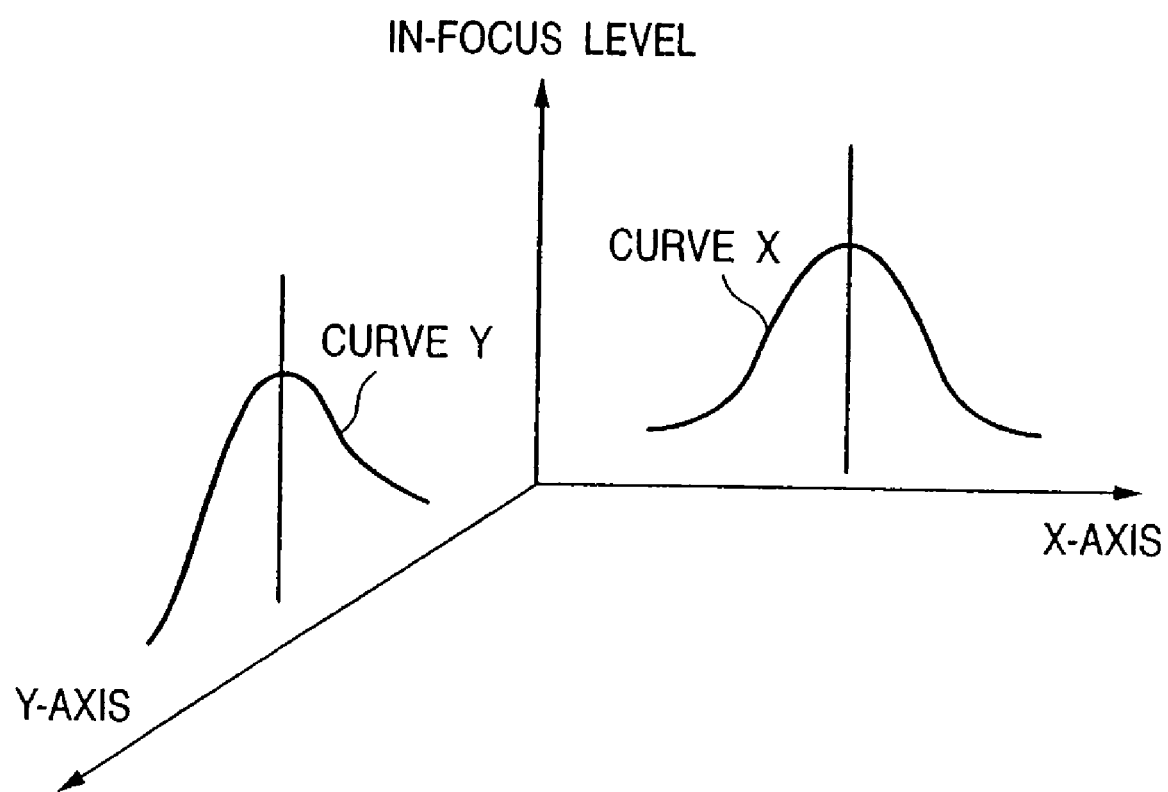
FIG. 3 shows the concept of intra-frame integrated value adjustment in two directions of X- and Y-axes.

FIG. 3 shows the concept of intra-frame integrated value adjustment in the two directions of the X- and Y-axes.

In this case, so-called hill-climbing control using a TV signal is done for the X- and Y-axes to optimize the whole frame.

For example, the Y-axis value is fixed at an arbitrary value, and hill-climbing control is done so that the high frequency component in the X-axis direction assumes a highest value. Next, while the X-axis value is fixed at the apex of the X-axis, hill-climbing control of a Y-axis component is executed, and tilted angles (θx, θy) corresponding to the apex values on the X- and Y-axes are stored.

Furthermore, the aforementioned adjustment may be executed under a predetermined condition or periodically so as to maintain relative precision above the apex values (X1, Y1).

Figure 4:
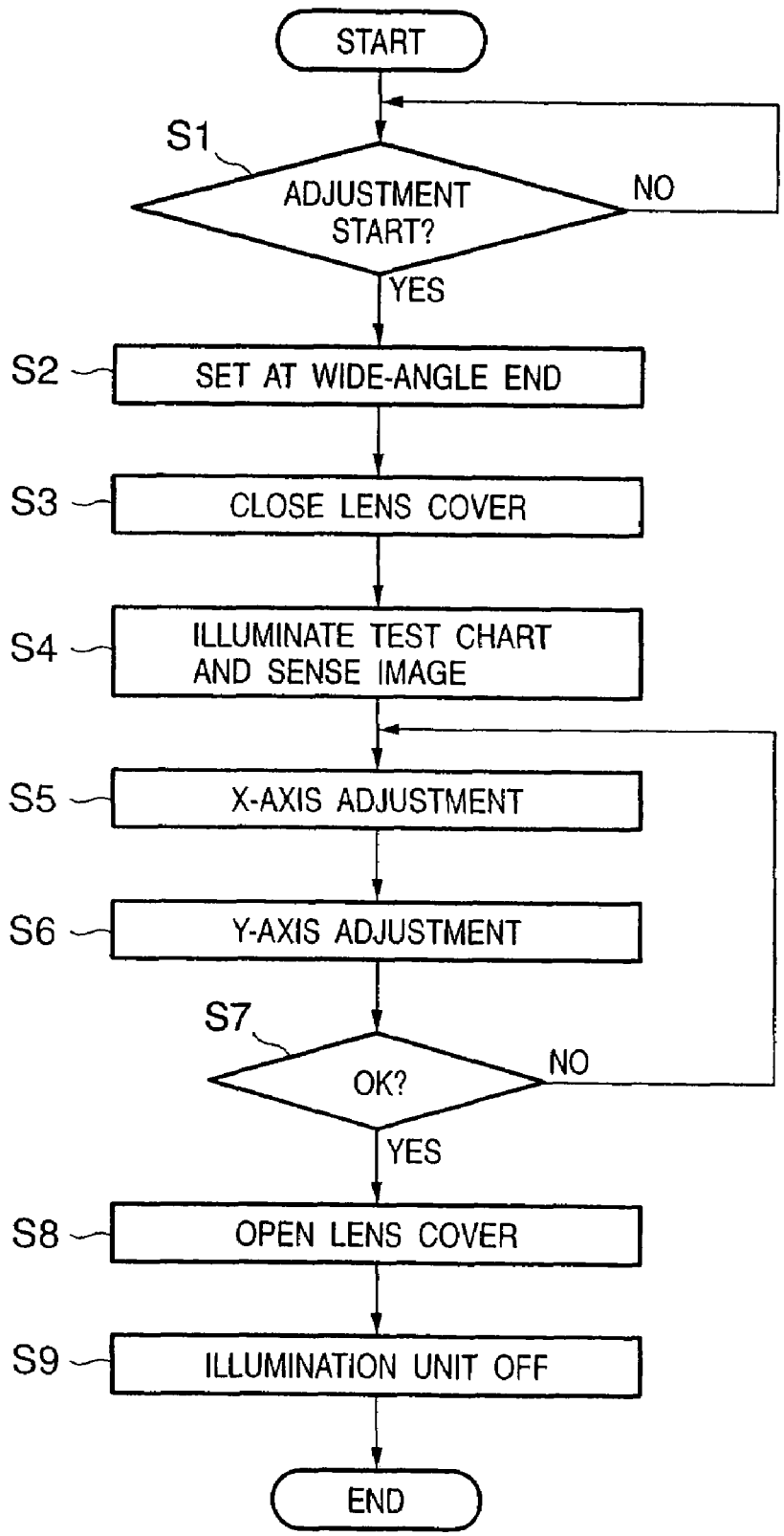
FIG. 4 is a flow chart showing the initial adjustment sequence according to the first embodiment of the present invention.

The aforementioned adjustment sequence will be explained below with reference to the flow chart shown in FIG. 4.

If the panel driver 10 detects an adjustment start instruction (condition) from the system controller 9 (step S1), the zoom unit 5 instructs the focal length adjustment optical system L1 to move toward the wide-angle end to allow photographing at the closest focal length position (step S2). A lens cover is closed (step S3), the emission controller 15 drives the illumination unit 14 to illuminate the test chart on the panel 13, and the image sensing element 1 senses an image of the test chart (step S4). Subsequently, the hill-climbing control for adjusting a tilt of the image sensing element 1 about the X-axis is executed (step S5), and the hill-climbing control for adjusting a tilt of the image sensing element 1 about the Y-axis is executed (step S6). Upon completion of adjustment about the two axes (YES in step S7), the lens cover is opened (step S8), and the illumination unit 14 is turned off at the same time (step S9).

In this way, initial adjustment is completed, and a steady image sensing process can be started.

As described above, according to the image sensing system of the first embodiment, automatic adjustment of the relative tilt between the image sensing element 1 and image sensing optical system 8 can be easily and accurately made to fall with a predetermined allowable range by a simple arrangement, and a further size reduction of the apparatus arrangement can be sufficiently coped with.

Since the test chart is provided in front of the lens of the image sensing optical system, it can be also used as a lens barrier, and full automatic initial adjustment can be implemented.

Second Embodiment

The second embodiment of the present invention will be described below.

An image sensing system of the second embodiment initially adjusts the relative tilt between the image sensing optical system 8 and image sensing element 1 as in the first embodiment, and the first embodiment is applied to an exchangeable lens type image sensing system in the second embodiment. Note that the same reference numerals denote the same building components and the like as those in the first embodiment, and a detailed description thereof will be omitted.

Figure 5:
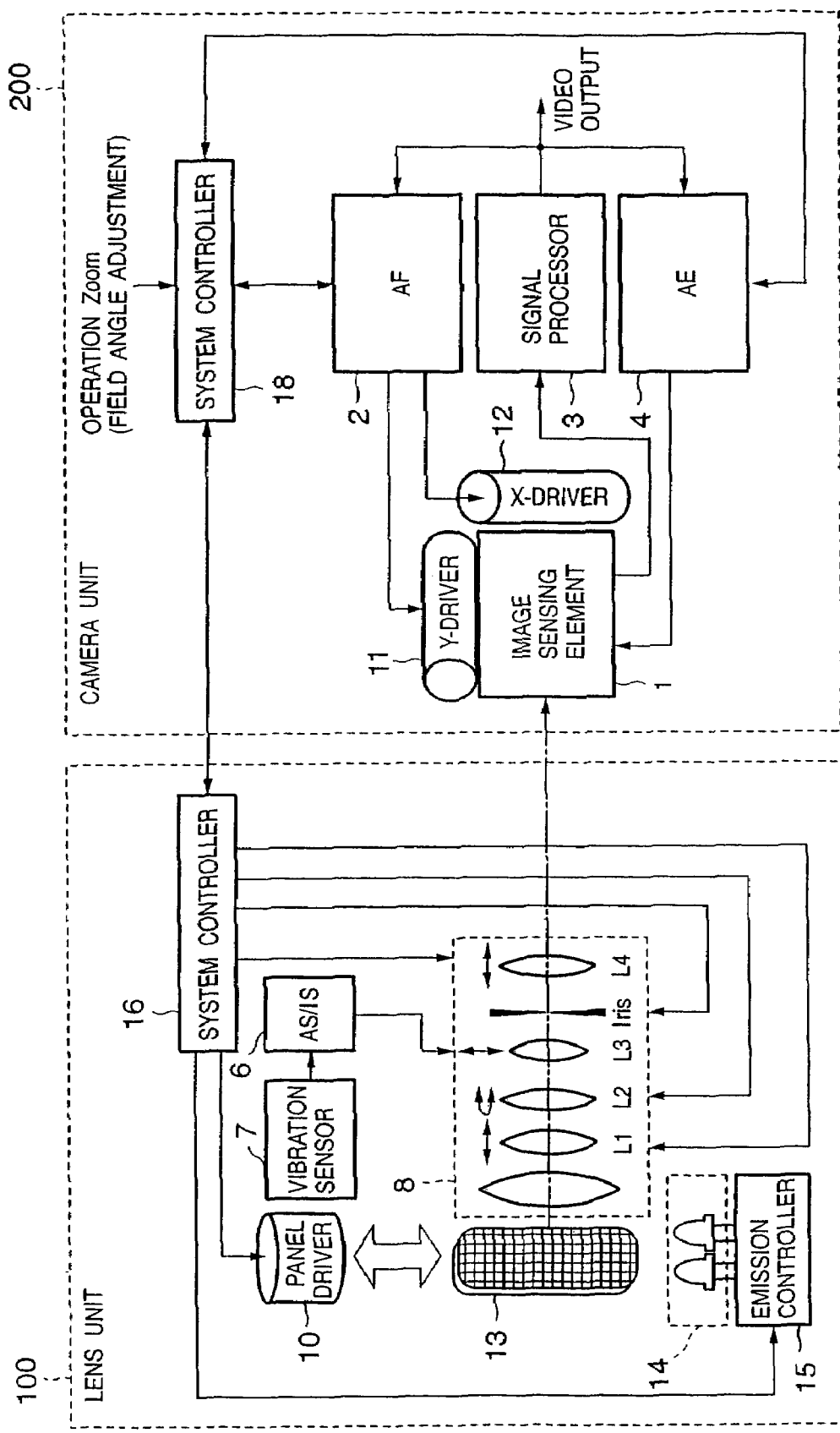
FIG. 5 is a block diagram showing the overall arrangement of an image sensing system according to the second embodiment of the present invention.

FIG. 5 is a block diagram showing the overall arrangement of the image sensing system according to the second embodiment of the present invention.

This image sensing system is roughly divided into a lens unit 100 and camera unit 200, which respectively comprise microcomputers serving as system controllers 16 and 18, and execute data communications between these microcomputers.

When the lens unit 100 is connected to the camera unit 200, the image sensing optical system 8 forms an object image on the image sensing element 1, which photoelectrically converts the object image. An image signal obtained by photoelectric conversion is processed by the signal processor 3 to obtain a color video signal. The processed video signal is output, and mainly its luminance information is supplied to the AE and AF units 4 and 2, which generate respective control signals and supply them to the system controller 18. Control data from the AE and AF units 4 and 2 are transferred from the system controller 18 to the system controller 16 of the lens unit 100 to control the Iris and the focal point position adjustment optical system L4. The AE unit 4 also controls the accumulation time of the image sensing element 1 for each frame as needed.

The vibration sensor 7 such as an acceleration sensor or the like in the lens unit 100 detects camera shake, and the shift optical system driving unit (AS/IS) 6 drives the optical system L3 to reduce the blur of an optical image caused by the camera shake.

Upon receiving an operation instruction signal for image sensing field angle (zoom) adjustment in accordance with an operator's request, the system controller 18 transfers it to the system controller 16 in the lens unit 100. The system controller 16 reads out a digital cam curve from the internal memory (not shown) of the lens unit 100, and controls the optical systems L1 and L2 in cooperation with each other.

The initial adjustment sequence in the second embodiment will be described below with reference to the adjustment flow chart shown in FIG. 6.

Figure 6:
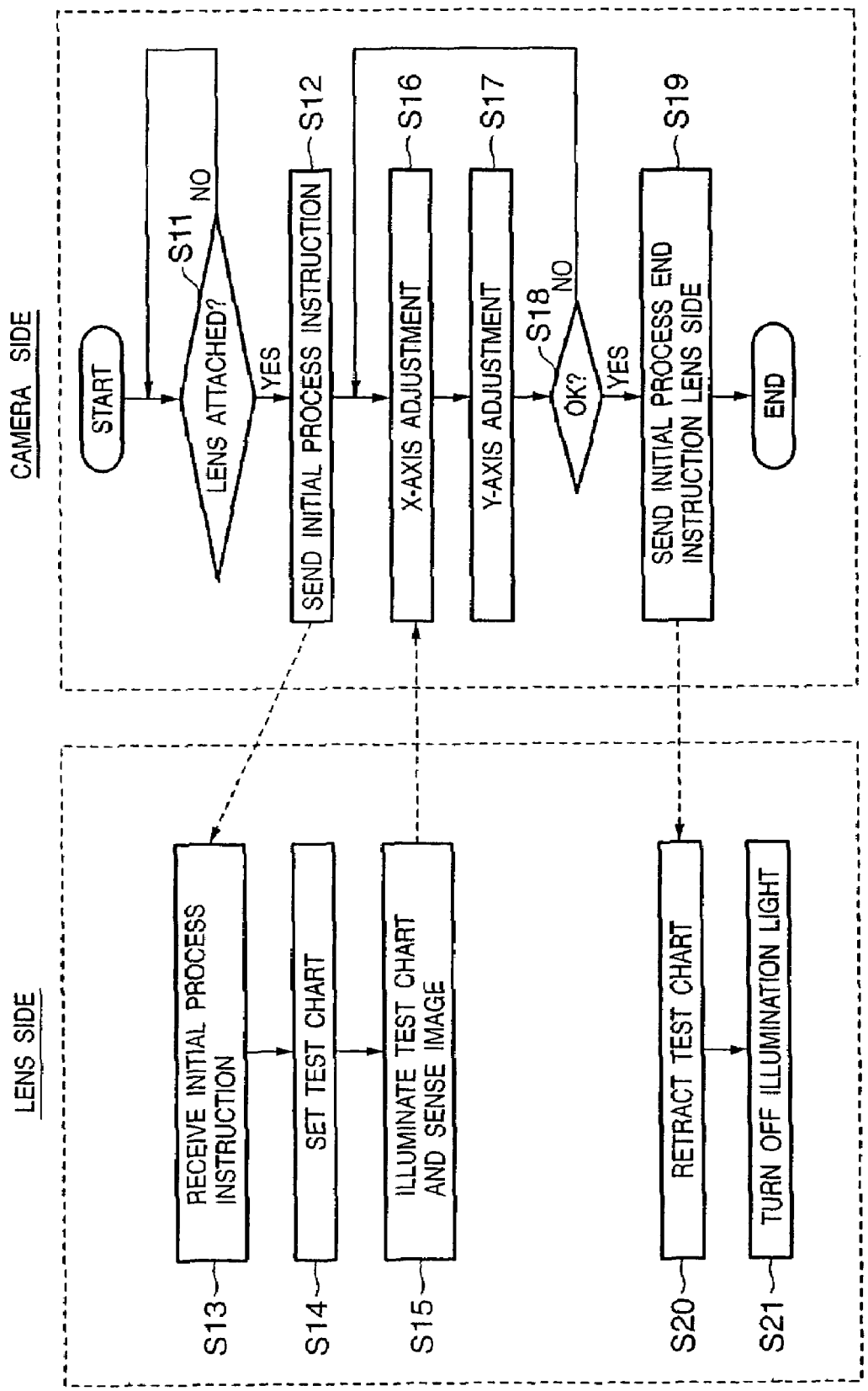
FIG. 6 is a flow chart showing the initial adjustment sequence according to the second embodiment of the present invention.

FIG. 6 shows an example of the data communication sequence between the system controller 16 in the lens unit 100 and the system controller 18 in the camera unit 200.

If attachment of the lens is detected (YES in step S11), the system controller 18 sends command data that instructs start of the initial process (step S12). Upon receiving this command data, the lens unit 100 sets the field angle at the wide-angle end (step S13), controls the panel driver 10 to insert the test chart of the panel 13 into the optical path (step S14), drives the illumination unit 14 to illuminate the test chart, and controls the image sensing element 1 to sense an image of the test chart (step S15). The hill-climbing control for adjusting the tilt of the image sensing element 1 about the X-axis is executed by the method mentioned using FIG. 3 (step S16), and the hill-climbing control for adjusting the position of the image sensing element 1 about the Y-axis is executed (step S17). If adjustment is not complete yet (NO in step S18), the flow returns to step S16; otherwise (YES in step S18), an initial process end instruction is sent to the system controller 16 of the lens unit 100 (step S19). The lens unit 100 retracts the test chart (step S20), and turns off the illumination unit 15 for the test chart (step S21), thus allowing normal photographing.

As described above, according to the image sensing system of the second embodiment, in addition to the effects of the first embodiment, even in the exchangeable lens type image sensing system, since data associated with adjustment can be exchanged via communications between the system controller 18 of the camera unit 200 and the system controller 16 of the lens unit 100, the relative state can be optimized even when image sensing optical systems having different characteristics are attached to the camera unit 200. Hence, an inappropriate image sensing frame on which an out-of-focus portion locally remains can be excluded, and a high-quality image can be sensed.

Third Embodiment

The third embodiment of the present invention will be described below.

Figure 7:
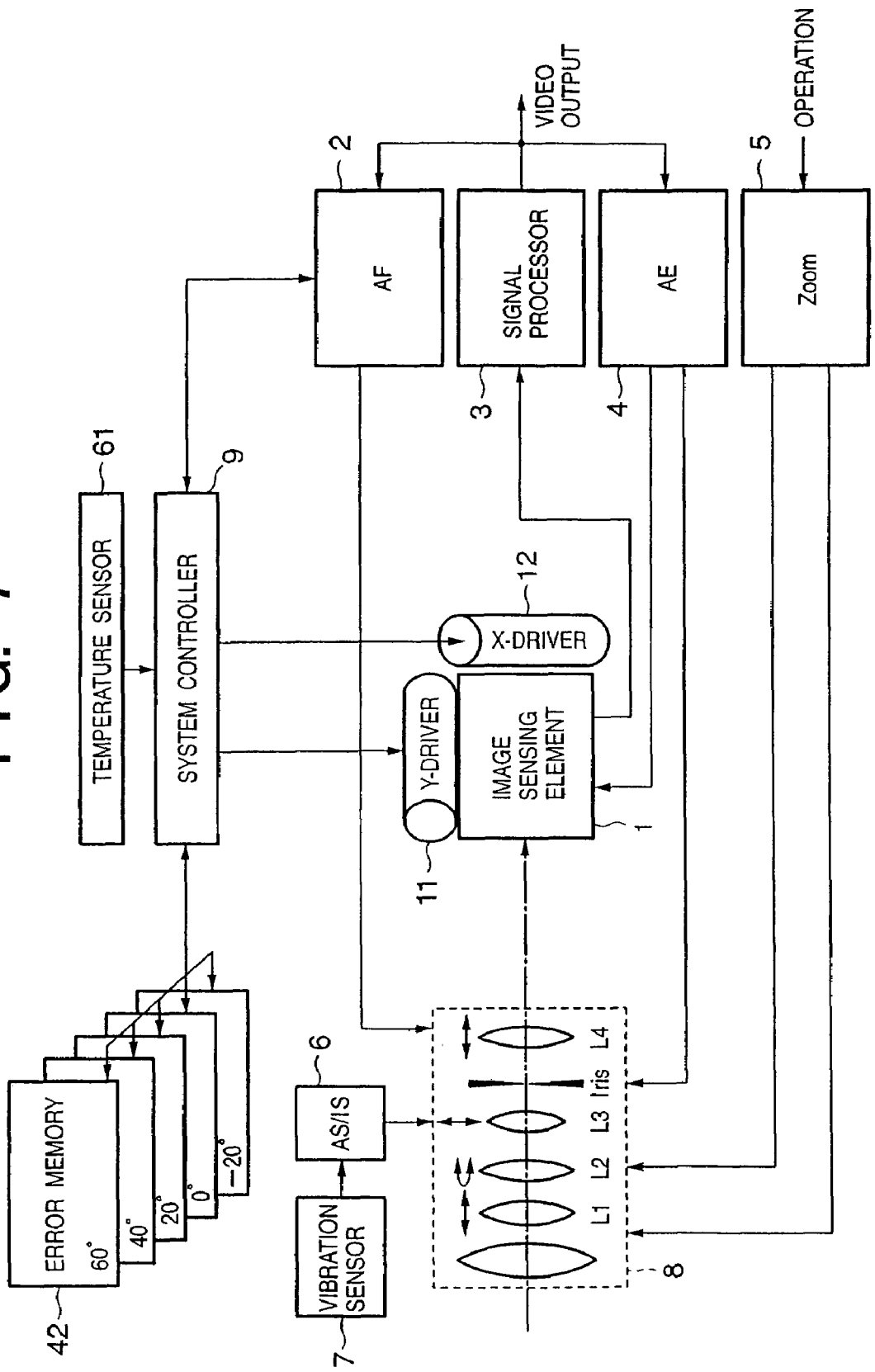
FIG. 7 is a block diagram showing the overall arrangement of an image sensing system according to the third embodiment of the present invention.

FIG. 7 is a block diagram showing the arrangement of an image sensing system according to the third embodiment of the present invention. The same reference numerals in FIG. 7 denote the same parts as in FIG. 1, and a description thereof will be omitted.

The image sensing system in the third embodiment shown in FIG. 7 does not have any arrangement associated with the test chart, and further comprises an error memory 42 for storing information that pertains to the relative angle of the image sensing element 1 with respect to the image sensing optical system 8, and a temperature sensor 61 for measuring the temperature inside the apparatus.

The information stored in the error memory 42 includes, for example, error information which corresponds to the positional difference between a reference image sensing element and a reference value obtained based on a test chart for position adjustment, which has prescribed horizontal and vertical frequency components, for each predetermined temperature associated with the relative position of the image sensing element 1 with respect to the image sensing optical system 8.

The drivers 11 and 12 adjust the relative state of the image sensing element 1 with respect to the image sensing optical system 8 to fall within a predetermined allowable range on the basis of the information in the error memory 42.

The system controller 9 controls the drivers 11 and 12 on the basis of information from the error memory 42 and temperature sensor 61.

A characteristic feature of the image sensing system of the third embodiment lies in that the relative state of the image sensing element 1 with respect to the image sensing optical system 8 is adjusted to fall within a predetermined allowable range (angle correction) by driving the drivers 11 and 12 on the basis of information read out from the error memory 42 prior to the image sensing operation.

A method of determining and storing the initial state of the image sensing element 1 will be described below with reference to FIGS. 8A, 8B, and 9.

Figure 8A:
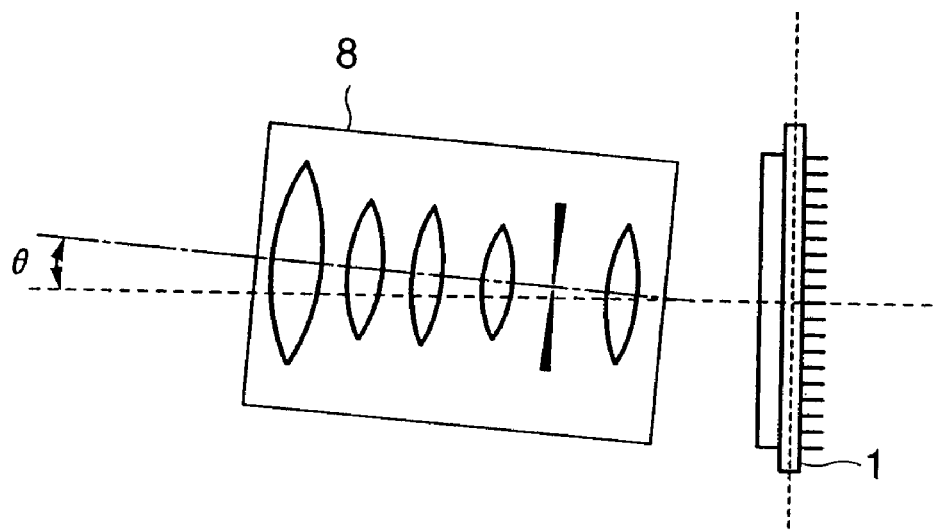
FIGS. 8A and 8B show the relative relationship between an image sensing optical system and image sensing element.
Figure 8B:
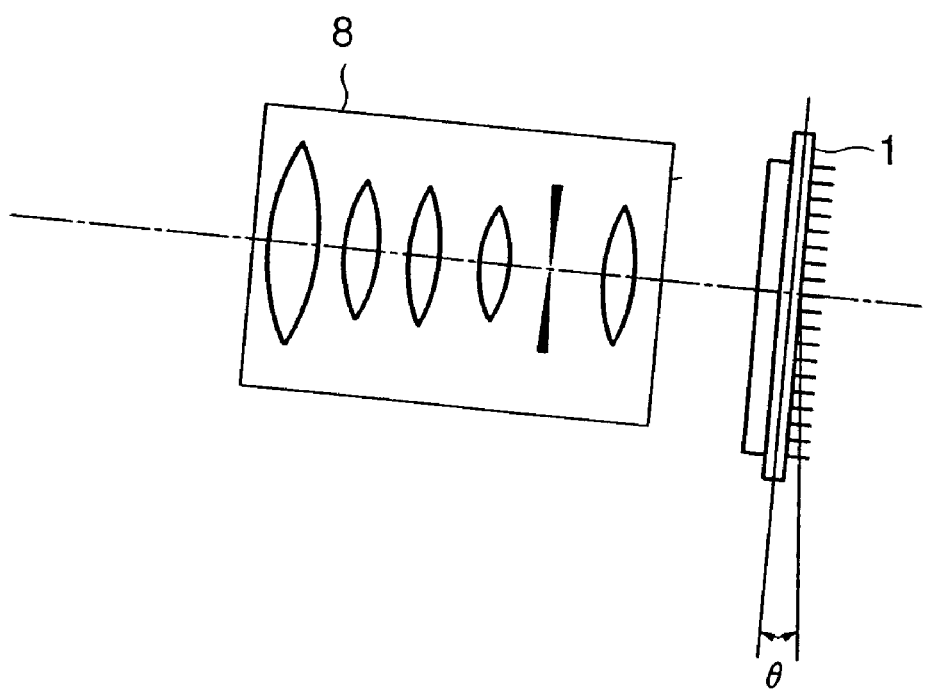

FIG. 8A shows the image sensing optical system 8 which is attached to have a tilt of θ° with respect to the image sensing element 1. The tilt of the image sensing optical system 8 can be corrected (its optical axis can be perpendicular to the image sensing element 1) by tilting θ° the image sensing element 1, as shown in FIG. 8B.

Therefore, in order to measure the tilt of the optical axis of the image sensing optical system 8 with the aforementioned arrangement, the image sensing optical system 8 forms an image of a measurement test chart 43 having X- and Y-frequency components on a reference image sensing element 40 set at a reference attachment position. The image sensing element 40 photoelectrically converts an optical image of the test chart 43, and outputs an electrical signal. The photoelectrically converted signal is converted by a signal processor 44 into a color (or monochrome) video signal, which is supplied to an evaluation unit 41. The evaluation unit 41 evaluates the relative position between the image sensing optical system 8 and reference image sensing element 40. There are some evaluation methods, and three methods will be explained below.

(1) The reference image sensing element 40 serving as a reference is tilted about the X- and Y-axes to detect a tilt angle corresponding to the maximum high frequency component.

(2) At an arbitrary measurement position on the reference image sensing element 40, a focus lens group is moved to maximize the high frequency components, and that position is stored. Similar operation is repeated at a plurality of different measurement positions on the reference image sensing element 40, and an optimal tilt angle of the reference image sensing element 40 is computed from the focus lens group position information for the respective measurement positions.

(3) At an arbitrary measurement position on the reference image sensing element 40, the test chart 43 is moved to maximize the high frequency components, and that position is stored. Similar operation is repeated at a plurality of different measurement positions on the reference image sensing element 40, and an optimal tilt angle of the reference image sensing element 40 is computed from the position information of the test chart 43 for the respective measurement positions.

The method of computing the optimal tilt angle can use a method based on so-called hill-climbing control that has been explained in the first embodiment using FIG. 3.

An angle (an error from a reference value) calculated by one of these three methods is stored in the error memory 42. This error memory 42 comprises a nonvolatile memory such as an EEPROM or the like, and is provided to a lens unit including the image sensing optical system 8. When this lens unit is attached to a camera main body to assemble the image sensing system, a system microcomputer in the camera main body can read out the angle stored in the error memory 42.

Conversely, a reference image sensing optical system serving as a reference may be prepared, and a tilt angle that the optical axis of this reference image sensing optical system makes with the image sensing element 1 can be acquired by the same operation as described above. In this case, a memory for storing this correction angle is provided to the camera main body having the image sensing element 1. When this correction angle is combined with the angle stored in the error memory 42 to obtain an initial value, the relative position between the image sensing element 1 and image sensing optical system 8 can be more precisely adjusted.

In order to further improve the precision, variations of a tilt angle due to a change in temperature in the image sensing system must be corrected. For this purpose, a plurality of pieces of error information corresponding to a plurality of temperatures are acquired, and are stored in the error memory 42. For example, tables may be prepared for respective temperatures, and may store respective parameter values. Five or six measurement temperatures in 20° C. increments can be stored to have ordinary temperature of 20° C. as the center. For example, temperatures are set like −20° C., 0° C., 20° C., 40° C., and 60° C.

In this case, the temperature inside the image sensing system is measured by the temperature sensor 61, error information is read out from a table with a value closest to the measured temperature of various parameter values for a plurality of temperatures, which are pre-stored in the error memory 42, and the relative position is corrected in accordance with the readout value. As a correction method, the drivers 11 and 12 adjust the attachment tilt angles of the image sensing element 1 about the X- and Y-axes, thus adjusting the relative state between the image sensing optical system and image sensing element.

Also, another adjustment system is available. The aforementioned error measurement operation of the relative position is executed at the time of factory adjustment after the image sensing optical system 8 and image sensing element 1 are built in the main body so as to measure information of drive amounts Dx and Dy of the drivers 12 and 11 from their drive reference points (the drive amounts to tilt the image sensing element 1 through tilt angles θx and θy described using FIG. 3) in correspondence with a plurality of temperatures, and measurement results are stored in the error memory 42. Prior to the image sensing operation, the system controller 9 reads out this information, and corrects the relative tilt of the image sensing element 1 by controlling the drivers 12 and 11.

Figure 10:
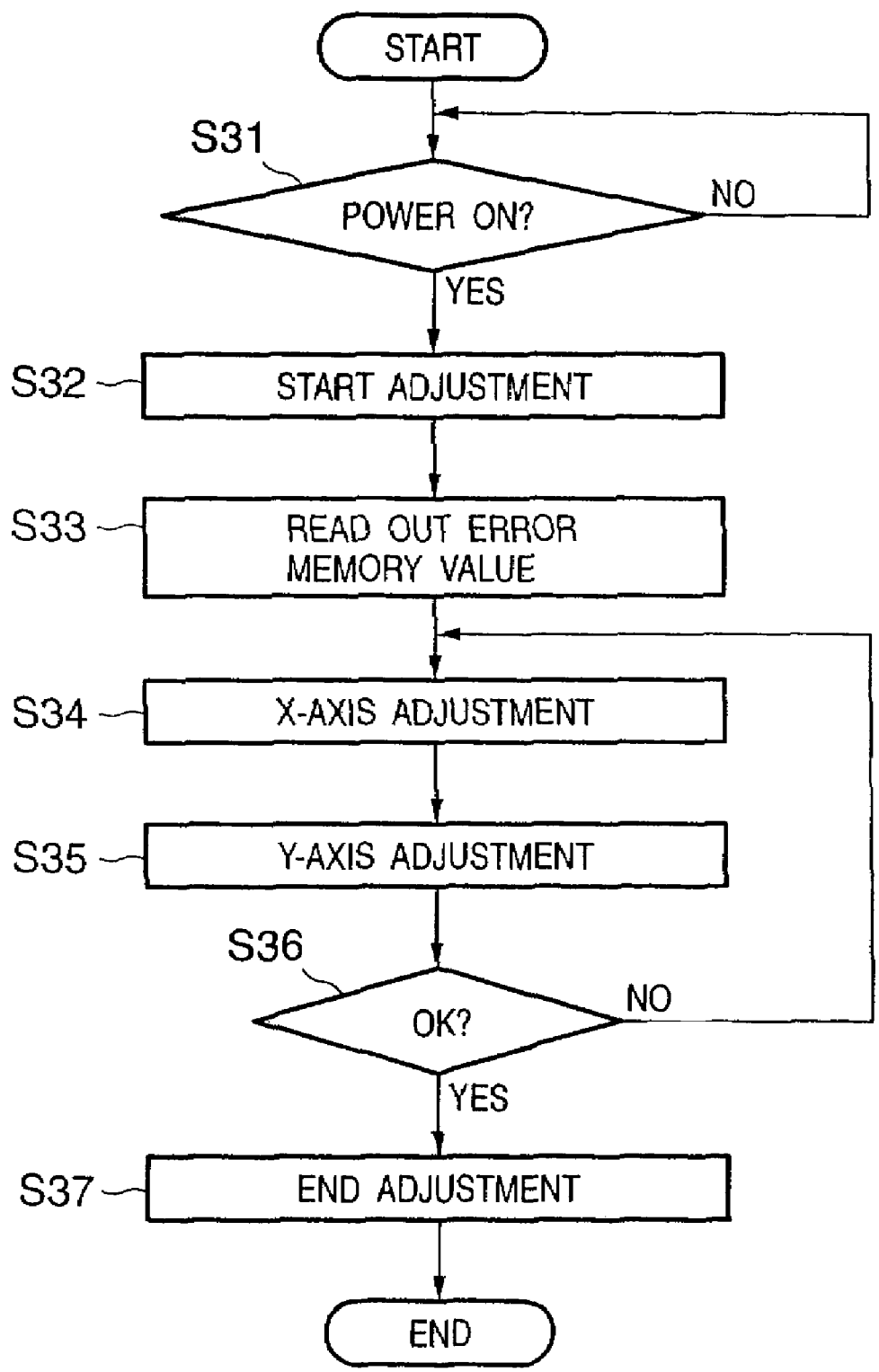
FIG. 10 is a flow chart showing the initial adjustment sequence according to the third embodiment of the present invention.

The aforementioned position adjustment sequence of the image sensing element 1 will be described below with reference to the flow chart shown in FIG. 10.

Upon detection of power ON (step S31), the system controller 9 starts position adjustment (step S32), and reads out information from the error memory 42 (step S33). The system controller 9 executes adjustment in the X-axis direction based on the readout information (step S34), and also executes adjustment in the Y-axis direction based on the readout information (step S35). Upon completion of adjustment (step S36), the adjustment operation ends (step S37).

In this way, initial adjustment is completed, and steady image sensing can be started.

Upon reading out information from the error memory 42 in step S33, the system controller 9 acquires the temperature from the temperature sensor 61, and reads out information corresponding to that temperature. In this way, a tilt angle that changes depending on the system temperature can be corrected in the X- and Y-axis adjustment processes in steps S34 and S35.

As described above, according to the third embodiment, automatic adjustment of the relative position of the image sensing element 1 with respect to the image sensing optical system 8 can be easily and accurately done to fall within a predetermined range by a simple arrangement, and a further size reduction of the apparatus arrangement can be sufficiently coped with.

When position adjustment information for each predetermined temperature is stored in the error memory 42, changes in response to lapse of time due to the temperature drift can be canceled.

Fourth Embodiment

The fourth embodiment of the present invention will be described below.

An image sensing system of the fourth embodiment initially adjusts the relative tilt between the image sensing optical system 8 and image sensing element 1 as in the third embodiment, and the third embodiment is applied to an exchangeable lens type image sensing system.

Figure 11:
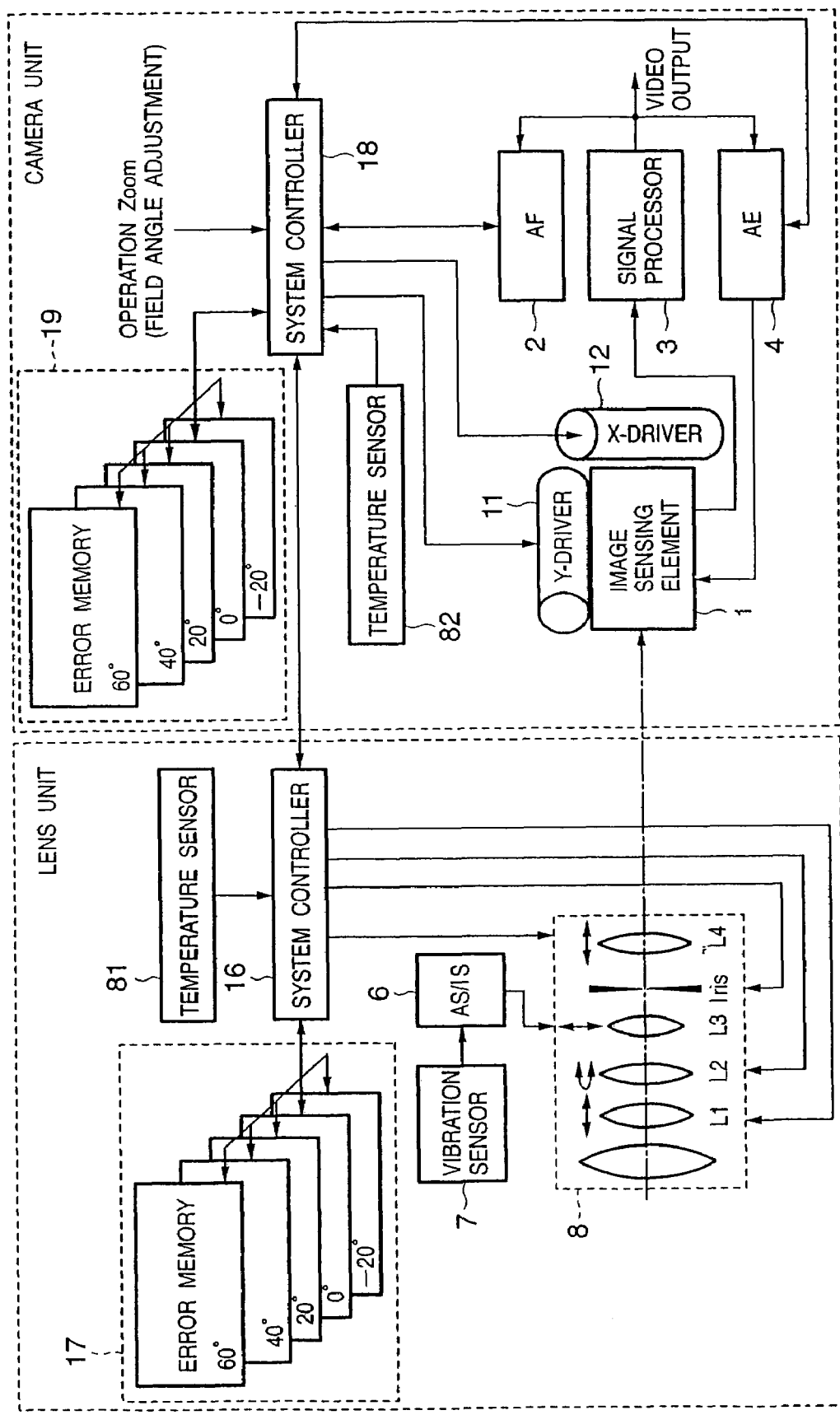
FIG. 11 is a block diagram showing the overall arrangement of an image sensing system according to the fourth embodiment of the present invention.

FIG. 11 is a block diagram showing the overall arrangement of the image sensing system according to the fourth embodiment of the present invention.

This image sensing system is roughly divided into a lens unit 100' and camera unit 200', which respectively comprise microcomputers serving as system controllers 16 and 18, and also error memories 17 and 19 in correspondence with these microcomputers, and executes data communications between the system controllers 16 and 18. In the fourth embodiment as well, the same reference numerals denote building components having the same functions as those shown in FIG. 7 and the respective figures of the third embodiment, and a description thereof will be partially omitted.

Figure 9:
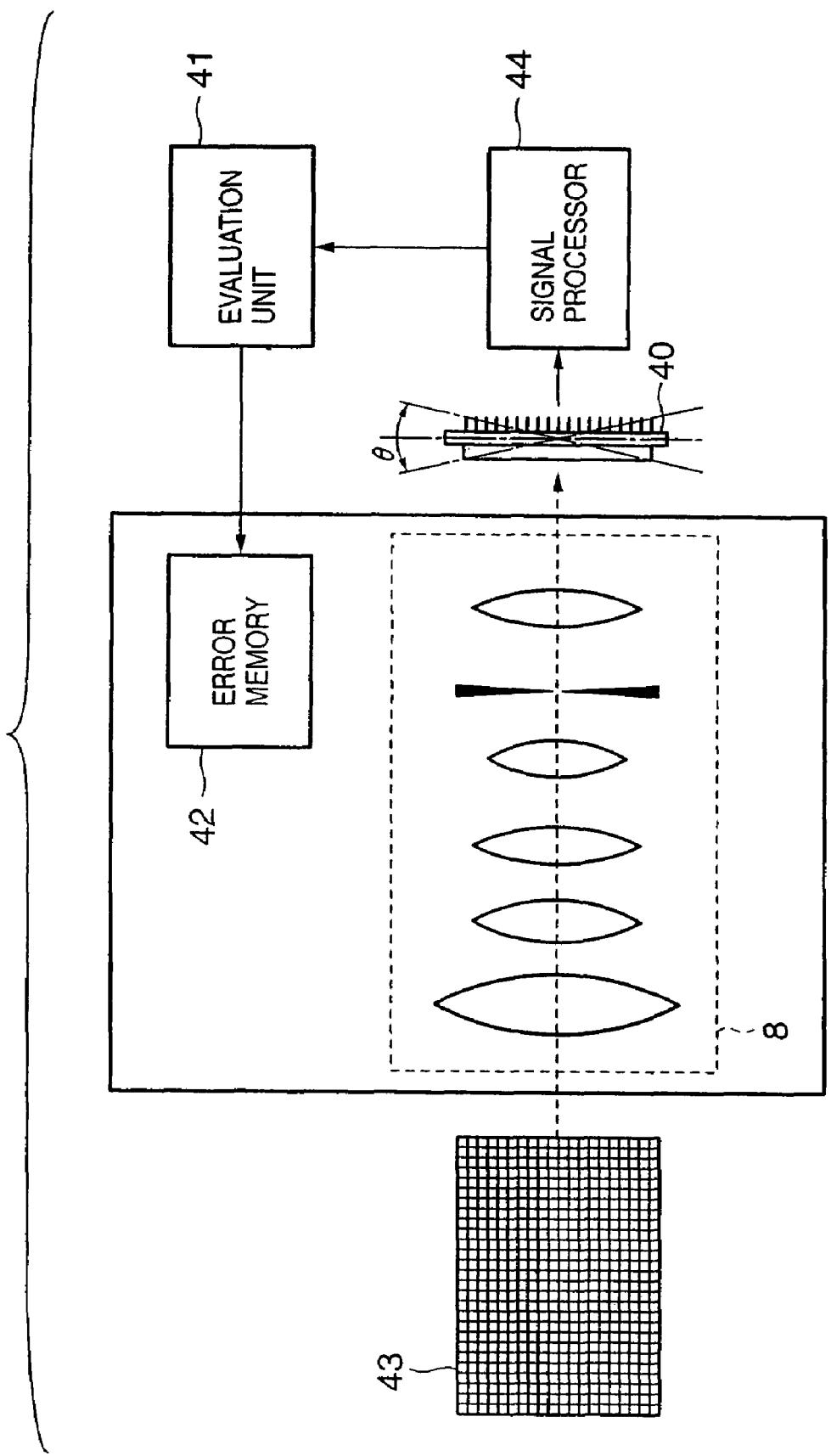
FIG. 9 is a schematic diagram showing a method of measuring and storing an initial position using a reference image sensing element.

In the fourth embodiment, both the lens unit 100' and camera unit 200' have the error memories 17 and 19 for storing the results of error detection from the reference such as the reference image sensing element 40 or the like, which is done as described in the third embodiment with reference to FIG. 9. Note that the error memory 17 in the lens unit 100' stores data detected using the reference image sensing element 40 as in the third embodiment, and the error memory 19 in the camera unit 200' stores data detected by the same method upon attaching a reference optical system to the camera unit 200'.

Prior to the normal image sensing operation, the system controller 16 of the lens unit 100' measures the temperature in the lens using a temperature sensor 81, reads out error information (information obtained by correcting the position adjustment information based on the measured temperature) from a table with a value closest to the measured temperature of various parameter values for a plurality of temperatures, which are pre-stored in the error memory 17, and transfers that value to the system controller 18 in the camera unit 200'.

Parallel to this operation, the system controller 18 in the camera unit 200' measures the temperature inside the camera unit 200' using a temperature sensor 82, reads out error information (information obtained by correcting the position adjustment information based on the measured temperature) from a table with a value closest to the measured temperature of various parameter values for a plurality of temperatures, which are pre-stored in the error memory 19, and executes tilt control of the image sensing element 1 by a correction method to be described later using the readout value and the value transferred from the lens unit 100'.

In this way, since both the camera unit 200' and lens unit 100' have the temperature sensors and store error tables, in the error memories, in correspondence with a plurality of temperatures, even when the temperature of the camera unit 200' is different from that of the lens unit 100', correction can be executed more appropriately.

After that, the image sensing optical system 8 forms an object image on the image sensing element 1, which photoelectrically converts the object image into an electrical signal. The electrical signal is processed by the signal processor 3 to obtain a color video signal. The processed video signal is output, and mainly its luminance information is supplied to the AE and AF units 4 and 2, which generate respectively control signals and input them to the system controller 18. The control data from the AE and AF units 4 and 2 are transferred from the system controller 18 in the camera unit 200' to the system controller 16 in the lens unit 100' to control the iris mechanism Iris and focal point position adjustment optical system L4. Also, the AE unit 4 controls the accumulation time of the image sensing element 1 for each frame as needed.

The vibration sensor 7 such as an acceleration sensor or the like in the lens unit 100' detects camera shake, and the shift optical system driving unit (AS/IS) 6 reduces blur of an object image caused by camera shake by driving the optical system L3.

Upon receiving an operation instruction signal for image sensing field angle (zoom) adjustment in accordance with an operator's request, the system controller 18 transfer it to the system controller 16 in the lens unit 100'. The system controller 16 reads out a digital cam curve from the internal memory (not shown) of the lens unit 100', and controls the focal length adjustment optical system L1, correction optical system L2, and focal point position adjustment optical system L4 in cooperation with each other.

The correction method will be explained below with reference to an error correction table shown in FIG. 12. In FIG. 12, an X-axis error indicates an error angle and shift amount from a reference position in the X-axis direction, and a Y-axis error indicates an error angle and shift amount from a reference position in the Y-axis direction.

O1–C1 and O3–C3 are computed to obtain relative error angles, and O2–C2 and O4–C4 are computed to obtain relative shift amounts, thus setting correction data.

The initial adjustment sequence in the fourth embodiment will be described below with reference to the flow chart shown in FIG. 13.

Figure 13:
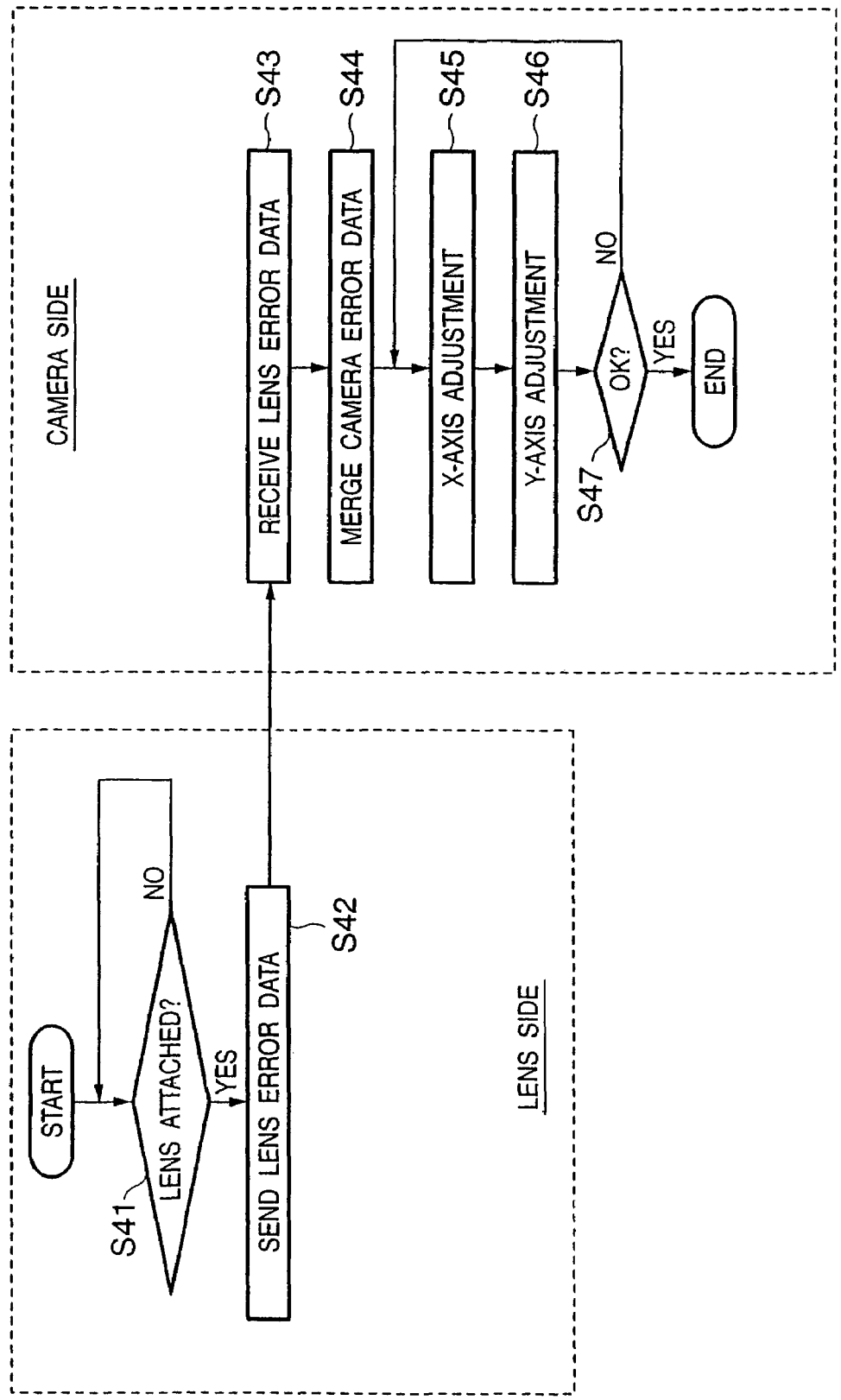
FIG. 13 is a flow chart showing the initial adjustment sequence according to the fourth embodiment of the present invention.

FIG. 13 shows an example of the data communication sequence between the system controller 16 in the lens unit 100' and the system controller 18 in the camera unit 200'.

If attachment of the lens is detected (YES in step S41), the system controller 16 sends error information stored in the error memory 17 in the lens unit 100' to the camera unit 200' (step S42). Subsequently, the system controller 18 in the camera unit 200' receives this information (step S43). The system controller 18 reads out error information from the error memory 19 in the camera unit 200' (step S44), and merges it with the error information from the lens unit 100' to generate respective correction data in accordance with the aforementioned sequence. The system controller 18 executes adjustment in the X-axis direction on the basis of the generated correction data (step S45), and also executes adjustment in the Y-axis direction on the basis of the generated correction data (step S46). Upon completion of adjustment (YES in step S47), the adjustment operation ends.

In this way, initial adjustment is completed, and steady image sensing can be started.

Upon reading out information from the error memories 17 and 19 in steps S42 and S44, the system controllers 16 and 18 respectively acquire the temperatures from the temperature sensors 81 and 82, and read out information corresponding to the acquired temperatures. In this way, a tilt angle that changes depending on the system temperature can be corrected in the X- and Y-axis adjustment processes in steps S45 and S46.

As described above, according to the fourth embodiment, in addition to the effects of the third embodiment, even in the exchangeable lens type image sensing system, since data associated with adjustment can be exchanged via communications between the system controller 18 of the camera unit 200' and the system controller 16 of the lens unit 100', the relative state can be optimized even when image sensing optical systems having different characteristics are attached to the camera unit 200'. Hence, an inappropriate image sensing frame on which an out-of-focus portion locally remains (so-called local out-of-focus state) can be excluded, and a high-quality image can be sensed.

Furthermore, since the lens and camera units respectively have memories, a highly compatible system can be built.

Furthermore, since both the camera and lens units have the temperature sensors and store error tables, in the error memories, in correspondence with a plurality of temperatures, even when the temperature of the camera unit is different from that of the lens unit, correction can be executed more appropriately.

Fifth Embodiment

The fifth embodiment will be described below.

Figure 14:
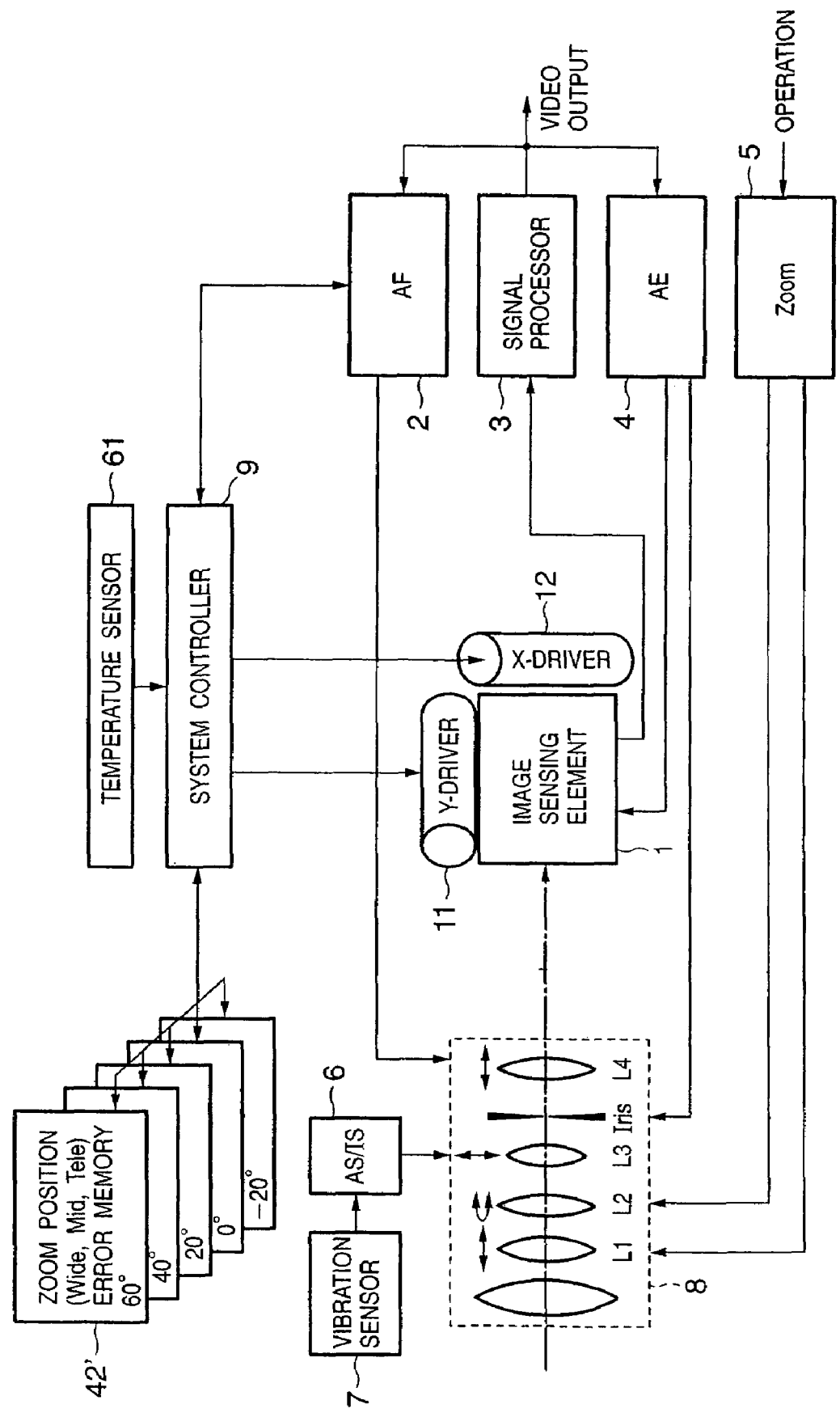
FIG. 14 is a block diagram showing the overall arrangement of an image sensing system according to the fifth embodiment of the present invention.

An example of the arrangement of an image sensing system according to the fifth embodiment will be described below with reference to FIG. 14. Note that the same reference numerals in FIG. 14 denote the same parts as those in FIG. 7, and a detailed description thereof will be omitted. In the fifth embodiment, the image sensing optical system 8 and its various parameters are controlled using control data of respective processors 2 to 5 (AF, AE, AS/IS, and Zoom).

The fifth embodiment will exemplify a case wherein adjustment based on especially zoom (field angle) information in steady control is positively done. The system controller 9 measures the temperature in the apparatus using a temperature sensor 61, reads out error information from a table with a temperature closest to the measured temperature of those of various parameter values for a plurality of temperatures, which are pre-stored in an error memory 42' by a method to be described later, detects the zoom (field angle) position of the image sensing optical system 8, reads out error information with a value closest to that zoom (field angle) position from that table, and executes relative position correction according to a value obtained by computing the respective values as needed in correspondence with a change in zoom (field angle) position.

As the correction method, the drivers 11 and 12 adjust the attachment tilt angles of the image sensing element 1 about the X- and Y-axes. In this manner, the relative state between the image sensing optical system 8 and image sensing element 1 can be adjusted.

As the focal length adjustment optical system (zoom lens) 11 of the image sensing optical system 8, a zoom lens especially having a high zoom ratio is becoming the mainstream; a change in zoom position or focal length or a change in f-number is becoming large, resulting in a large change in focal depth. Also, high-sensitivity zoom lenses are prevalent, and the tilt direction and angle of an ideal image surface due to manufacturing errors often change largely.

Hence, the variation of the tilt angle of the image surface according to the zoom position of the focal length adjustment optical system L1 of the image sensing optical system 8 must be corrected occasionally. To acquire a correction value therefor, using the same arrangement as in FIG. 9 the reference imaging sensing element 40 is tilted about the X- and Y-axes at a plurality of zoom positions from the wide-angle end to the telephoto end of the focal length adjustment optical system L1 of the imaging sensing optical system 8 so as to detect a tilt angle corresponding to the maximum high frequency component, and this angle (deviation from a reference value) is stored as respective parameter values in the form of a table for each zoom (field angle) position in the error memory 42'. Note that the method of detecting an appropriate tilt angle can use the method described in the first embodiment with reference to FIG. 3.

This error memory 42' comprises a nonvolatile memory such as an EEPROM or the like, and is provided to a lens unit including the image sensing optical system 8. When this lens unit 8 is attached to a camera main body to assemble the image sensing system, a system microcomputer in the camera main body can read out the angle stored in the error memory 42'.

Note that a reference image sensing optical system serving as a reference may be prepared to measure an attachment position error of the image sensing element 1 based on this reference image sensing optical system, and a memory for storing error information of the image sensing element 1 may be provided. When this memory is provided for each camera main body in the exchangeable lens type image sensing system, an effective system can be constructed.

In order to further improve the precision, since variations of the tilt angle of the image sensing element 1 due to a change in temperature in the apparatus must be corrected, tables may be prepared for respective temperatures to store error values corresponding to a plurality of temperatures, and can store respective parameter values. Five or six measurement temperatures in 20° C. increments can be stored to have ordinary temperature of 20° C. as the center. For example, measurement temperatures are set like −20° C., 0° C., 20° C., 40° C., and 60° C.

Figure 15:
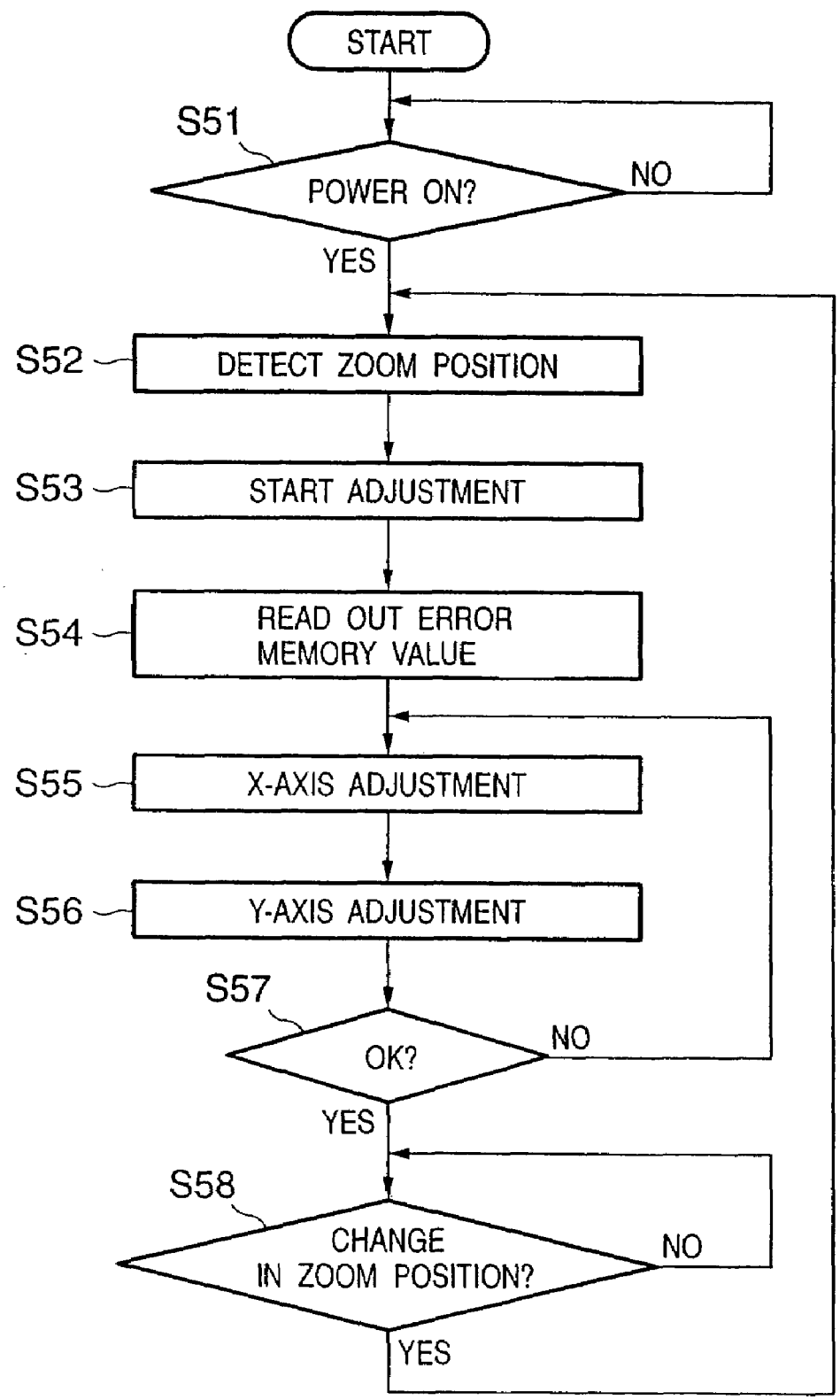
FIG. 15 is a flow chart showing the initial adjustment sequence according to the fifth embodiment of the present invention.

The adjustment sequence will be described below with reference to the flow chart in FIG. 15.

It is detected in step S51 if the power supply is turned on. Upon detection of power ON, the zoom position of the image sensing optical system 8 is detected in step S52, and adjustment of the tilt angle of the image sensing element 1 starts in step S53. Data is read out from the error memory 42' in step S54, and X-axis adjustment of the image sensing element 1 is executed based on the readout data in step S55. Likewise, Y-axis adjustment of the image sensing element 1 is executed based on the readout data in step S56.

It is checked in step S57 if the adjustment processes for two axes are complete. Upon completion of adjustment, the adjustment operation ends in step S58. After that, the zoom position of the image sensing optical system 8 is monitored, and upon detection of a change in zoom position, the flow returns to step S52. An image is sensed while executing the aforementioned operation.

As described above, according to the fifth embodiment of the present invention, since errors of the optical system from a reference value are pre-stored in correspondence with various factors such as assembling precision, zoom position, temperature, and the like, even when the image sensing optical system 8 has a tilt with respect to the image sensing element 1 in various combinations of the image sensing optical systems 8 and image sensing elements 1, good characteristics can be realized.

Sixth Embodiment

The sixth embodiment of the present invention will be described below with reference to FIG. 16.

An image sensing system of the sixth embodiment initially adjusts the relative tilt between the image sensing optical system 8 and image sensing element 1 as in the fifth embodiment, and the fifth embodiment is applied to an exchangeable lens type image sensing system.

Figure 16:
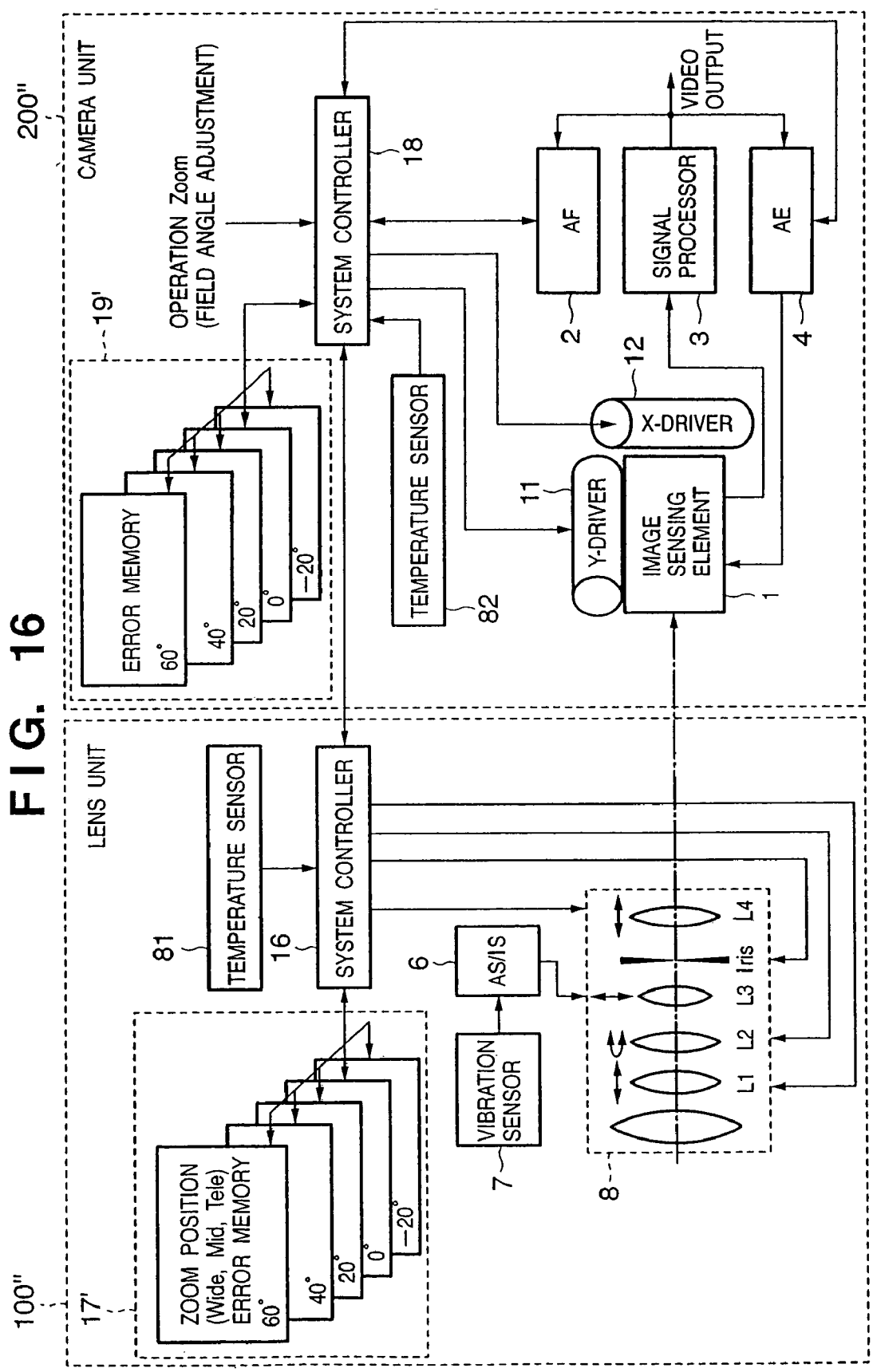
FIG. 16 is a block diagram showing the overall arrangement of an image sensing system according to the sixth embodiment of the present invention.

A video camera according to the sixth embodiment is roughly divided into a lens unit 100" and camera unit 200", which respectively comprise microcomputers serving as system controllers 16 and 18, as shown in FIG. 16, and execute data communications between these microcomputers. In the sixth embodiment as well, the same reference numerals denote building components having the same functions as those described in FIGS. 11 and 14, and a description thereof will be partially omitted.

In the sixth embodiment, both the lens unit 100" and camera unit 200" have error memories 17' and 19' for storing the results of error detection from the reference such as the reference image sensing element 40 or the like, which is done as described in the third embodiment with reference to FIG. 9. Note that the error memory 17' in the lens unit 100" stores data detected using the reference image sensing element 40 as in the fifth embodiment, and the error memory 19' in the camera unit 200" stores data detected by the same method upon attaching a reference optical system to the camera unit 200".

Prior to normal image sensing operation, the system controller 16 of the lens unit 100" measures the temperature in the lens using a temperature sensor 81, detects the zoom (field angle) position of the image sensing optical system 8 at the same time, reads out error information corresponding to the detected zoom (field angle) position using a table with a value closest to the measured temperature of various parameter values for a plurality of temperatures, which are pre-stored in the error memory 17', and transfers that value to the system controller 18 in the camera unit 200".

Parallel to this operation, the system controller 18 in the camera unit 200" measures the temperature inside the camera unit 200" using a temperature sensor 82, reads out error information using a table with a value closest to the measured temperature of various parameter values for a plurality of temperatures, which are pre-stored in the error memory 19', and executes the tilt control of the image sensing element 1 by a correction method to be described later using the readout information and the error information value transferred from the lens unit 100".

Since both the camera unit 200" and lens unit 100" store the temperature sensors and error memory tables in correspondence with a plurality of temperatures, even when the temperature of the camera unit 200" is different from that of the lens unit 100", correction can be executed more appropriately.

An object image is formed on the image sensing element 1 via the image sensing optical system 8, which has the focal length adjustment optical system L1 for adjusting the image sensing field angle, the correction optical system L2 for making correction corresponding to the movement of the optical system L1, the shift optical system L3 for camera-shake-correction, the iris mechanism Iris for adjusting the amount of incoming light, and the focal point position adjustment optical system L4 for making focus adjustment. The formed image is photoelectrically converted by the image sensing element 1, and is processed by the signal processor 3 to obtain a color video signal. The processed video signal is output, and mainly its luminance information is supplied to the exposure control (AE) unit 4 and focus adjustment (AF) unit 2, which respectively generate control signals and input them to the system controller 18. The control data from the AE and AF units 4 and 2 are transferred from the system controller 18 in the camera unit 200" to the system controller 16 in the lens unit 100" to control the iris mechanism Iris and focal point position adjustment optical system L4. Also, the AE unit 4 controls the accumulation time of the image sensing element 1 for each frame as needed.

The vibration sensor 7 such as an acceleration sensor or the like in the lens unit 100" detects camera shake, the shift optical system driving (AS/IS) unit 6 reduces blur of an object image caused by camera shake by driving the optical system L3.

Upon receiving an operation instruction signal for image sensing field angle adjustment in accordance with a user's request, the system controller 18 transfer it to the system controller 16 in the lens unit 100". The system controller 16 reads out a digital cam curve from the internal memory (not shown) of the lens unit 100", and controls the focal length adjustment optical system L1 and correction optical system L2 in cooperation with each other.

The temperature information and zoom position are always monitored. Upon receiving a zoom position change instruction from the system controller 16 in the lens unit 100", error information corresponding to that zoom position is read out from the error memory 17', and that value is transferred to the system controller 18 in the camera unit 200", thus executing the tilt control of the image sensing element 1 as needed.

The correction method in the sixth embodiment will be explained below with reference to an error correction table shown in FIG. 12. In FIG. 12, an X-axis error indicates an error angle and shift amount from a reference position in the X-axis direction, and a Y-axis error indicates an error angle and shift amount from a reference position in the Y-axis direction.

(O1−C1) and (O3−C3) are computed first. Then, correction data is computed by adding (O2−C2) and (O4−C4) to the computation results of {1−COS(O1−C1)} and {1−COS(O3−C3)}, respectively.

Figure 17:
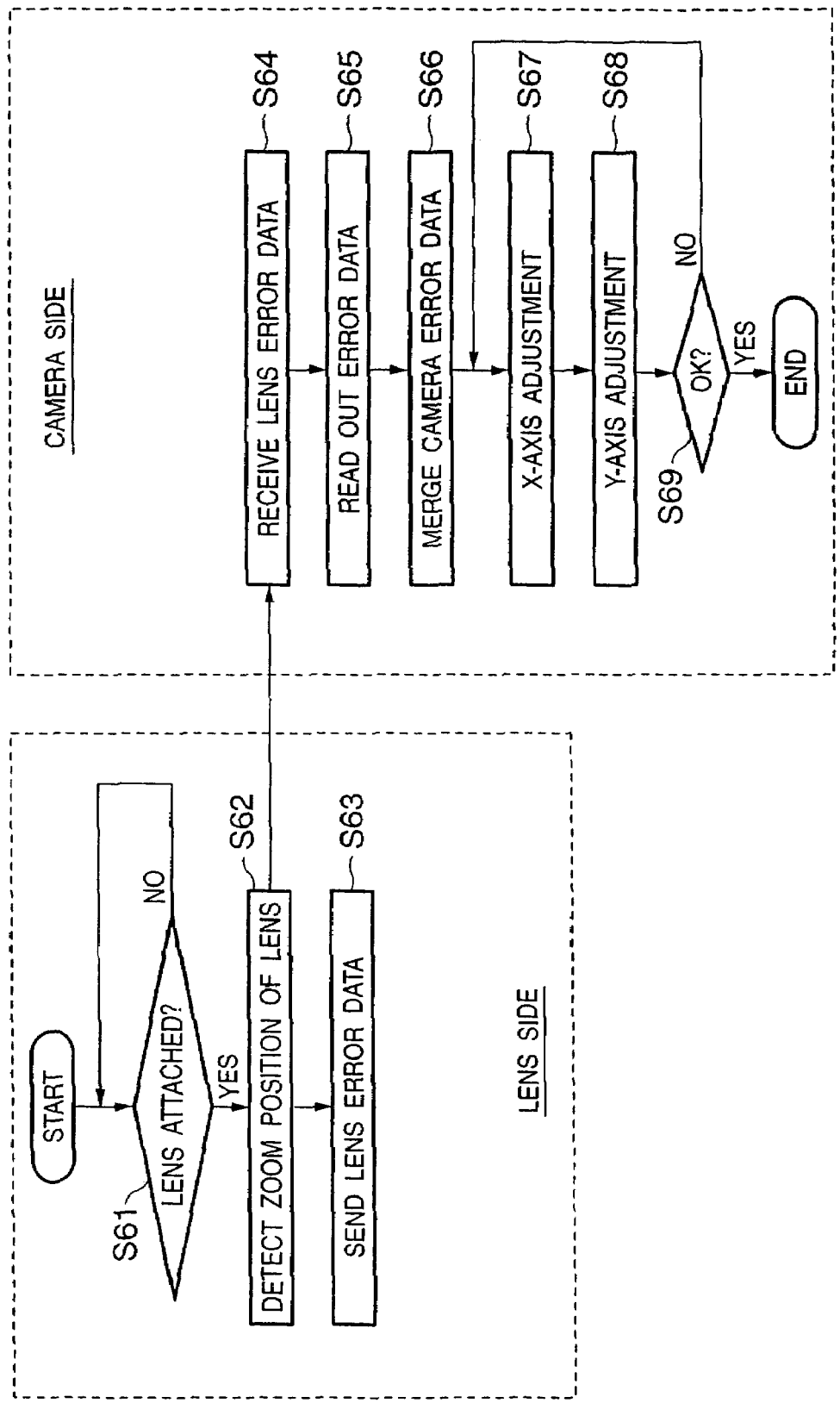
FIG. 17 is a flow chart showing the initial adjustment sequence in the sixth embodiment of the present invention.

FIG. 17 is a flow chart showing the operation sequences of the system controller 16 in the lens unit 100" and the system controller 18 in the camera unit 200". The operation sequences of the system controller 16 in the lens unit 100" and the system controller 18 in the camera unit 200" will be described below with reference to FIG. 17.

It is detected in step S61 if a lens is attached. If the lens is attached, the zoom (field angle) position of the lens is detected in step S62, and error data stored in the error memory 17' in the lens unit 100" is sent to the camera unit 200" in step S63.

The camera unit 200" receives the sent error data in step S64. Error data is read out from the error memory 19' in the camera unit 200" in step S65, and is merged with the received lens error data in step S66 to generate correction data, as described above.

X-axis adjustment is executed based on the generated correction data in step S67, and Y-axis adjustment is executed based on the generated correction data in step S68. Upon completion of adjustment in step S69, the processing ends. After that, the zoom position is always monitored, and upon detection of a change in zoom position, the flow returns to step S62 to restart the processing.

As described above, according to the sixth embodiment of the present invention, in the exchangeable lens type image sensing system, since the lens unit 100" and camera unit 200" respectively have the error memories 17' and 19', deterioration of the image quality due to the tilt of the image sensing element 1 can be corrected even when a lens is exchanged to another; thus building a highly compatible system.

Furthermore, since both the camera and lens units have the temperature sensors 81 and 82, and store error tables in the error memories 17' and 19' in correspondence with a plurality of temperatures, even when the temperature of the camera unit is different from that of the lens unit, correction can be made more appropriately.

Moreover, the tilt of the image sensing element 1 can be optimally corrected as needed in accordance with the zoom (field angle) position.

Seventh Embodiment

The seventh embodiment will be described below.

Figure 18:
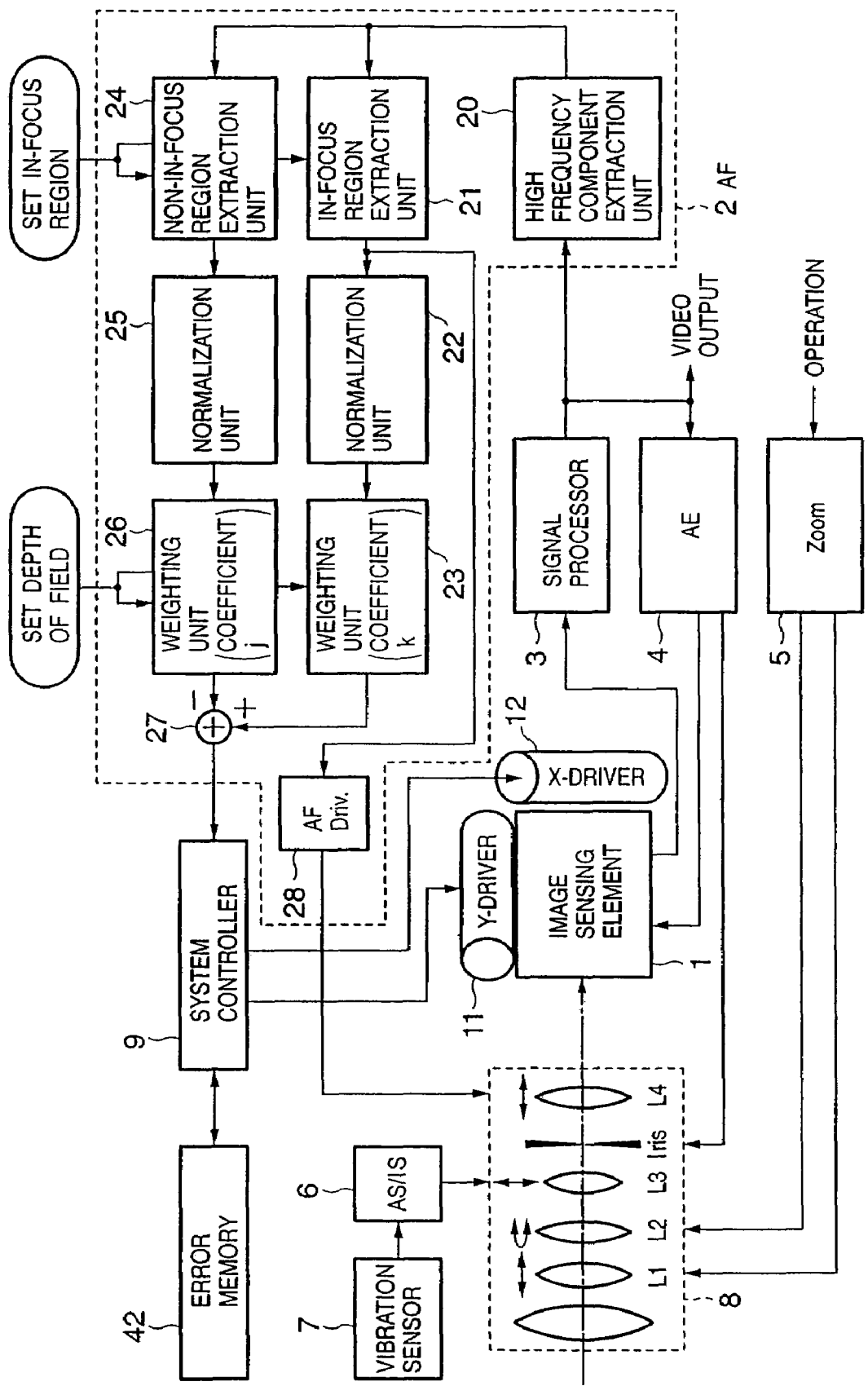
FIG. 18 is a block diagram showing the overall arrangement of an image sensing system according to the seventh embodiment of the present invention.

FIG. 18 is a block diagram showing the overall arrangement of an image sensing system of the seventh embodiment. The same reference numerals in FIG. 18 denote the same parts as those in FIG. 1, and a description thereof will be omitted.

A characteristic feature of the image sensing system of the seventh embodiment lies in that the operator inputs an instruction of an operation mode or the like in accordance with his or her photographic purpose, and the relative position (angle) between the image sensing optical system 8 and image sensing element 1 is corrected to fall within a predetermined allowable range in accordance with parameter values set by the operator, thus realizing various photographic effects (e.g., the background is made out of focus by setting a shallow depth of field).

To realize the above effects, the operator inputs an operation instruction (more particularly, "field depth setting value" and/or "in-focus region setting value") to the AF unit 2 in accordance with his or her photographic purpose prior to the image sensing operation, and the drivers 12 and 11 adjust the tilt of the image sensing element 1 in accordance with these values.

Reference numeral 42 denotes an error memory for storing the initial state of the image sensing element 1, i.e., a reference state before image sensing (drive amounts Dx and Dy of the drivers 12 and 11 from their reference points, i.e., the drive amounts to tilt the image sensing element 1 through tilt angles θx and θy described using FIG. 9). Based on the stored information of the initial state, the image sensing element 1 is set at a predetermined initial position before an operation instruction in accordance with the operator's photographic purpose is input.

The system controller 9 controls the AF unit 2, drivers 11 and 12, and error memory 42.

In the seventh embodiment, the attachment tilt angles of the image sensing element 1 about the X- and Y-axes are adjusted using the drivers 12 and 11 in accordance with the "field depth setting value" and "in-focus region setting value" input to the AF unit 2 after adjustment to the initial state, thereby adjusting the relative position between the image sensing element 1 and image sensing optical system 8.

Also, a readjustment system for resetting the image sensing element 1 to an initial position after the image sensing element 1 is adjusted to an arbitrary value in accordance with the operator's instruction is required.

Note that the setting value for setting the image sensing element 1 at an initial position is stored in the error memory 42 at the time of factory adjustment after the image sensing optical system 8 and image sensing element 1 are assembled in the main body. In this case, drive amounts Dx and Dy of the drivers 11 and 12 from their reference points, which correspond to angles obtained by executing the error measurement operation of the relative position between the image sensing optical system 8 and reference image sensing element 40, as described above with reference to FIG. 9, are stored as initial values in the error memory 42. The position of the image sensing element 1 is adjusted using the drive amounts Dx and Dy. Since the adjusted value is stored as an initial value in the error memory 42, the setting value used to obtain a given photographic effect can be canceled to restore the initial value upon completion of the photographing operation with the photographic effect according to the operator's photographic purpose.

Figure 19:
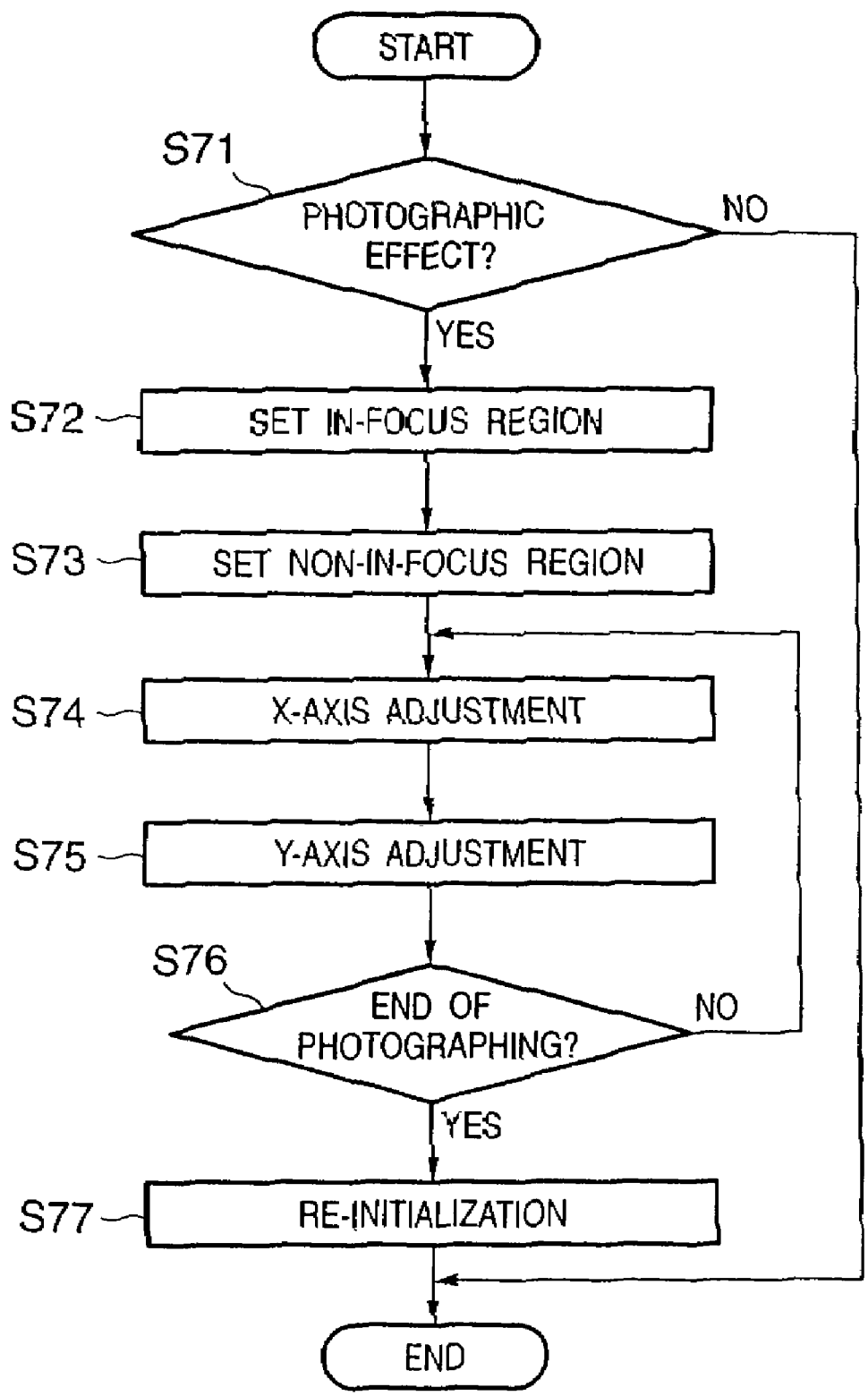
FIG. 19 is a flow chart showing the position adjustment operation upon taking a photo with the photographic effect according to the seventh embodiment of the present invention.

The position adjustment sequence of the image sensing element 1 upon taking a photo with a photographic effect according to the seventh embodiment will be described below with reference to the flow chart in FIG. 19.

Upon detection of an image sensing start instruction, it is checked if a photographing operation with a given photographic effect is instructed (step S71). If a normal photographing operation without any photographic effect is instructed, the processing ends since the image sensing element 1 need not undergo any special control. On the other hand, if a photographing operation with a given photographic effect is instructed, an "in-focus region" to be focused by the AF unit 2 is set under the control of the system controller 9 (step S72), and a "non-in-focus region" is set as the inverted region of the "in-focus region" (step S73). Subsequently, hill-climbing control for adjusting the tilt of the image sensing element 1 about the X-axis is executed (step S74), and hill-climbing control for adjusting the tilt of the image sensing element 1 about the Y-axis is executed (step S75). During the photographing operation with the photographic effect, the aforementioned two-axis control is always executed. Upon completion of the photographing process with the photographic effect (YES in step S76), re-initialization is done (step S77) to reset the image sensing element 1 to the tilt for a normal photographing process without any photographic effect.

In this way, position adjustment of the image sensing element 1 is completed, and normal image sensing can be restarted.

The method of setting an in-focus region and non-in-focus region will be described below with Preference to FIGS. 20A to 20C.

A1 in FIG. 20A indicates the entire frame to be sensed. Note that a person on the right side of the frame is bounded by the broken line, and this broken line region is an area which is designated by a two-dimensional pointer called an X-Y joystick, X-Y pad, or the like and is superimposed on the image sensing viewfinder. The operator sets an in-focus region B1 shown in FIG. 20B while confirming this superimposed image on the viewfinder.

Then, the operator sets a non-in-focus region C1 shown in FIG. 20C in the same sequence. The AF unit 2 executes focus adjustment to maximize the high frequency component of the set in-focus region, and controls to minimize the high frequency component of the non-in-focus region. Note that control is made to preferentially assure in-focus of the in-focus region B1 by setting a large weighting coefficient for an evaluation value of the in-focus region B1. In this connection, since a region which is set as neither the in-focus region nor the non-in-focus region is not evaluated, in-focus/non-in-focus of such region as the photographing result is not under this control.

Figure 21A:
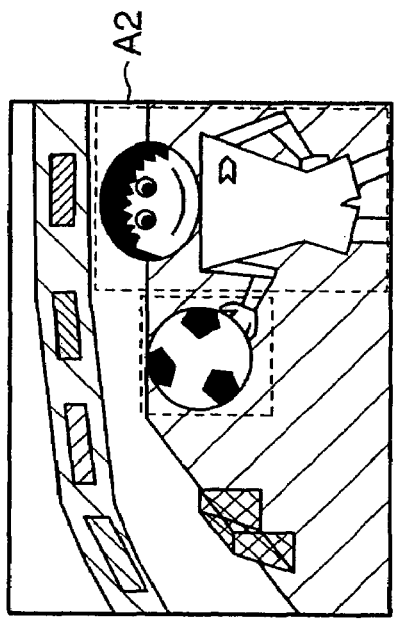
FIGS. 21A to 21C show another method of setting in-focus and non-in-focus regions.
Figure 21C:
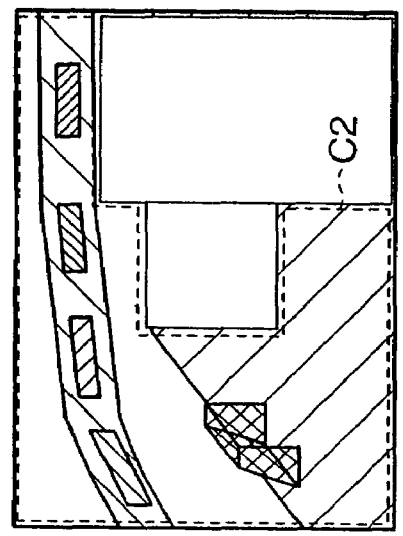
Figure 21B:
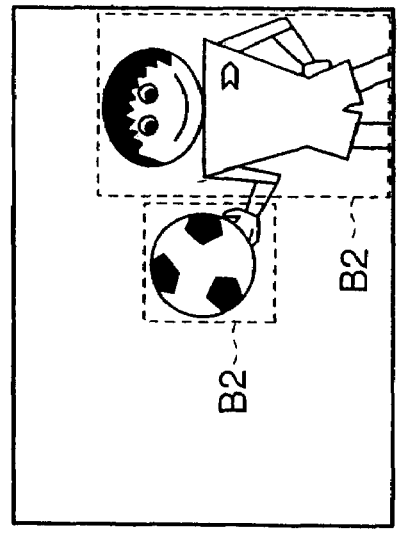

FIGS. 21A to 21C show another region setting method. In this example, two in-focus regions, i.e., a person and ball, are set. On the entire frame to be sensed shown in FIG. 21A, two in-focus regions B2 are set in FIG. 21B. As a result of this setting, the entire region to be sensed other than the in-focus regions B2 is set as a non-in-focus region C2, as shown in FIG. 21C.

As an example of the setting method of each region, a rectangular region can be set by determined two factors, i.e., the central position and size of the region using the aforementioned X-Y pointer, or determining two points, i.e., one point and its diagonal point (e.g., upper left and lower right points).

In this connection, as a special example of the X-Y pointer, the aforementioned position designation can be attained by a line of sight detector provided near the viewfinder that the photographer looks in. In this case, since it is difficult to accurately designate a region, the central points of the in-focus and non-in-focus regions may be designated, and the size of each region may use a predetermined value.

In the seventh embodiment, upon focusing an object which obliquely faces the image sensing surface, only a portion of the object is in focus by pivoting the image sensing surface in a direction opposite to the tilt and shift direction, i.e., using an inverse tilt and shift effect. This method will be explained in detail below with reference to FIG. 22.

Figure 22:
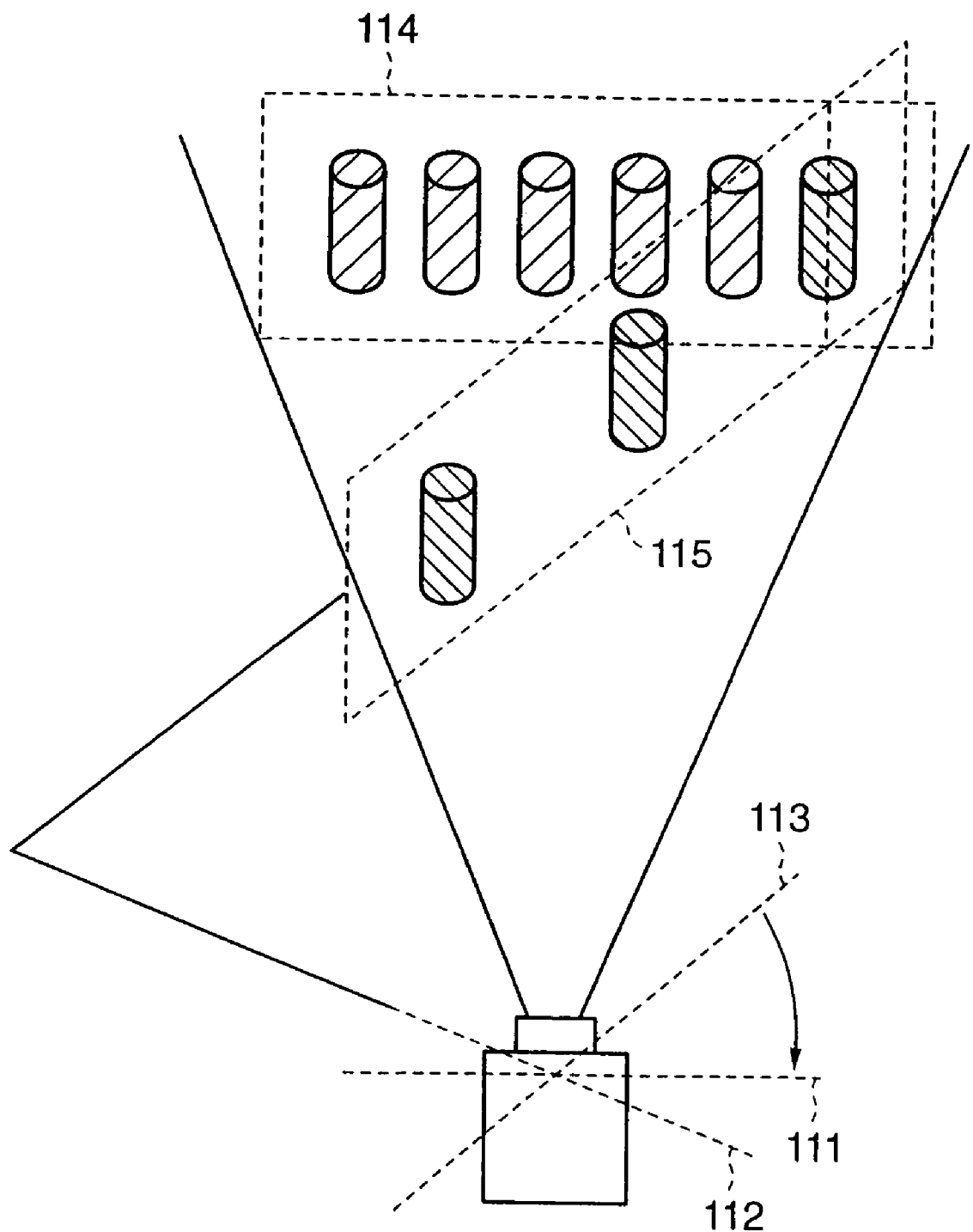
FIG. 22 is a schematic view for explaining an inverse tilt and shift effect according to the seventh embodiment.
Figure 23:
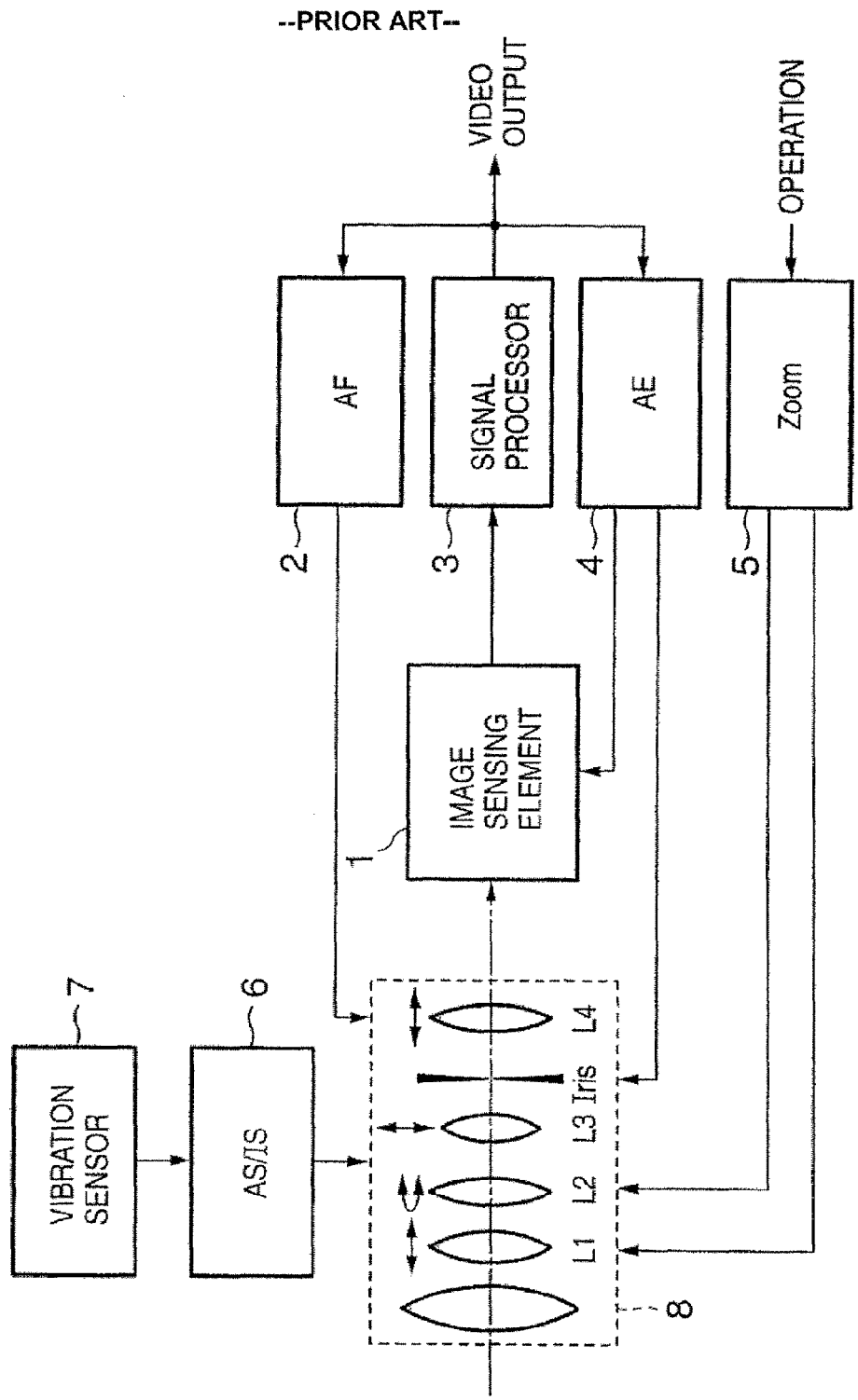
FIG. 23 is a block diagram showing the overall arrangement of a conventional image sensing system.
Figure 24:
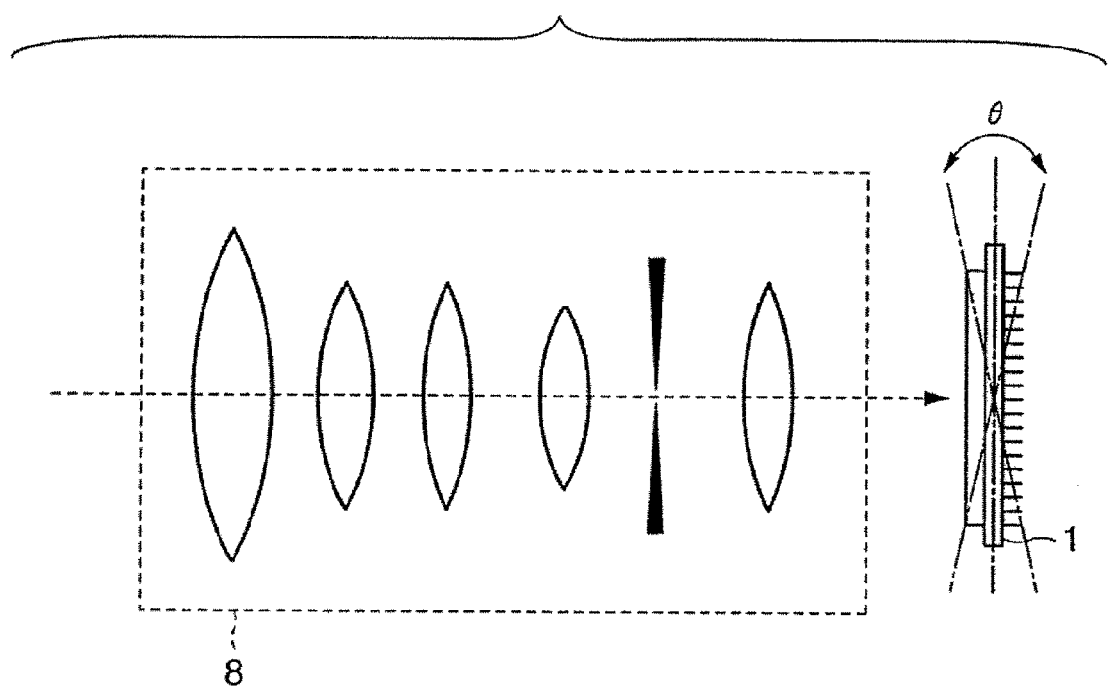
FIG. 24 is a schematic view showing a variation of an angle that the optical axis of an image sensing optical system makes with an image sensing element.

In a normal state, an object parallel to the image sensing surface is in focus, as indicated by broken lines 111 and 114 in FIG. 22, an object with a depth before and after the focal point is nearly in focus due to the presence of the depth of field. Therefore, when an object is located on a plane that obliquely faces the image sensing surface 111, as indicated by 115, an object falling outside the depth of field determined by the stop value (f-number) of a lens used (the left object in the box 115 in FIG. 22) cannot be in focus in principle. However, when the image sensing surface is tilted to satisfy the known Scheimpflug principle, as indicated by 112, the oblique plane can be in focus independently of the depth of field.

When the image sensing surface is tilted in a direction opposite to 112 by exploiting the reverse effect of this principle, as indicated by 113, an object can be set largely outside the depth of field, and a shallow-depth photo in which only a portion of an object is in focus can be taken. Using this effect, a photo having different in-focus states on the in-focus and non-in-focus region described in FIGS. 20A to 20C and FIGS. 21A to 21C can be taken.

In this way, by controlling/setting the angle θ to an intentionally large predetermined angle, a so-called "inverse-tilt and shift photographing" technique of a silver halide camera can be implemented, and a photographic effect substantially equivalent to shallow field-depth photographing can be obtained by focusing only an arbitrary object.

The AF unit 2 will be described in more detail below with reference to FIG. 18.

As described above, an image signal processed by the signal processor 3 is output as a video camera video signal, and is also used in focus adjustment and inverse tilt and shift adjustment in the AF unit 2.

A high frequency component extraction unit 20 extracts only high frequency components of an image signal used to determine an in-focus state, and an in-focus region extraction unit 21 and non-in-focus region extraction unit 24 extract only information of the set regions on the basis of the aforementioned in-focus/non-in-focus region information.

The information that pertains to the in-focus region is supplied to a driver 28 for the purpose of normal focal point position adjustment, and the driver 28 controls the focal point position adjustment optical system L4 of the optical system 8 on the basis of this information.

Normalization units 22 and 25 multiply by the reciprocal number of the area ratio of the respective areas to correct the difference in area of the respective set regions. For example, if the area of the in-focus region is 1/5 the entire frame, while that of the non-in-focus area is 4/5, the value of the in-focus region is multiplied by 1/1, and that of the non-in-focus region is multiplied by 1/4.

Thereafter, weighting units 23 and 26 further multiply by coefficients k and j. For a deep depth of field, the coefficient j is set to a small value, and for a shallow depth of field, the coefficient j is set to a large value.

These products from the weighting unit 23 and 26 are computed by an adder/subtractor 27, and the result is passed to the system controller 9. The system controller 9 controls to drive the drivers 11 and 12 based on this computation result by tilting the image sensing element 1 about the X- and Y-axes, and detecting the tilt angle corresponding to the maximum high frequency component, thus implementing a desired photographic effect.

As described above, according to the image sensing system of the seventh embodiment, in an image sensing system such as a video camera or the like in which the focal length shortens as a result of size reductions of the image sensing element 1 and image sensing optical system 8, and the depth of field tends to be deep, a photographic effect upon taking a photo as if an arbitrary shallow depth of field were set can be obtained by correcting the relative angle between the image sensing optical system 8 and image sensing element 1 within a predetermined allowable range in accordance with an operation instruction (parameter) set by the operator.

After the photographing operation with the photographic effect, initialization can be easily done without any complicated operations required to revert to a normal photographing state, and an image sensing system which is easy to use can be realized.

Note that the adjustment to the initial state according to the seventh embodiment can adopt any of the methods of the first, third, and fifth embodiments.

Also, the seventh embodiment can be applied to an exchangeable lens type image sensing system described in the fourth and sixth embodiments.

In the first to seventh embodiments, the relative position between the image sensing optical system 8 and image sensing element 1 is adjusted by changing the tilt of the image sensing element 1. However, the present invention is not limited to such specific method. For example, an optical member for independently adjusting optical path lengths in the X- and Y-axis directions may be inserted before the image sensing element, and the relationship between the optical member and the image sensing element may be optimized by adjusting the optical member about the two axes.

It should be noted that the present invention includes combinations of the aforesaid embodiments or technical elements disclosed therein.

Further, the present invention also includes an apparatus, formed by all or a part of the apparatuses disclosed in the embodiments of the present invention, which can be used either individually, with another apparatus, or within another apparatus.

Further, the control method of the image sensing system of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts in FIGS. 4, 6, 10, 13, 15, 17, and 19 described in the embodiments.

The present invention is not limited to the above embodiments and various changes and modifications can be made within the spirit and scope of the present invention. Therefore to apprise the public of the scope of the present invention, the following claims are made.

What is claimed is:

1. An image sensing system comprising:
    an image sensing element for photoelectrically converting incoming light from an image sensing optical system into an image signal;
    one memory device provided in an image sensing unit for storing error information of the image sensing element and another memory device provided in the image sensing optical system for storing error information of the image sensing optical system, where the error information in the one memory includes an adjustment amount of the image sensing element and the error information in the another memory includes an adjustment amount of the image sensing optical system for a plurality of temperatures;
    one temperature detector provided in the image sensing unit for detecting temperatures of the image sensing element and another temperature detector provided in the image sensing optical system for detecting temperatures of the image sensing optical system; and
    an adjusting unit for adjusting a relative position of the image sensing element and the image sensing optical system based on the error information read from the one memory device and the another memory device associated with the temperatures of the respective image sensing element and the image sensing optical system detected by the respective one temperature detector and another temperature detector.

2. The system according to claim 1, wherein said adjusting unit comprises a driver for changing a tilt of said image sensing element.

3. The system according to claim 2, wherein said driver changes a position of said image sensing element.

4. The system according to claim 1, wherein the image sensing optical system comprises:
    a field angle adjustment lens; and
    a field angle manipulation unit for manipulating a field angle.

5. The system according to claim 1, wherein the adjusting unit adjusts the relative position in such a way that the optical axis of the image sensing optical system is normal to a light-receiving surface of the image sensing element.

6. The system according to claim 1, wherein the image sensing optical system is exchangeable.

7. A method of controlling an image sensing system which comprises an image sensing element for photoelectrically converting incoming light from an image sensing optical system into an image signal, comprising:
    storing error information of the image sensing element in one memory device provided in an image sensing unit and storing error information of the image sensing optical system into another memory device provided in the image sensing optical system, where the error information in the one memory device includes an adjustment amount of the image sensing element and the error information in the another memory device includes an adjustment amount of the image sensing optical system for a plurality of temperatures;
    detecting temperatures of the image sensing element by one temperature detector provided in the image sensing unit and detecting temperatures of the image sensing optical system by another temperature detector provided in the image sensing optical system; and
    adjusting a relative position of the image sensing element and the image sensing optical system based on the error information stored at the storing step in the one memory device and stored at the storing step in the another memory device associated with the temperatures of the respective image sensing element and the image sensing optical system detected respectively at the detecting step by the one detector and at the detecting step by the another detector.

8. The method according to claim 7, wherein upon the adjustment, a tilt of the image sensing element is changed.

9. The method according to claim 7, wherein upon the adjustment, a position of the image sensing element is changed.

10. The method according to claim 7, wherein the memory device stores the adjustment amount used to correct a tilt of the image sensing element with respect to a reference line.

11. The method according to claim 7, further comprising:
adjusting a field angle of the image sensing optical system by an adjustment lens; and
manipulating a field angle by a field angle manipulation unit.

12. The method according to claim 7, wherein the adjusting step adjusts the relative position in such a way that the optical axis of the image sensing optical system is normal to a light-receiving surface of the image sensing element.

13. A computer readable medium having computer readable program code embodied in said medium configured to control an image sensing system which comprises an image sensing element for photoelectrically converting incoming light of a predetermined pattern from an image sensing optical system into an image signal, the program code comprising steps of:

detecting temperatures of the image sensing element by one temperature detector provided in an image sensing unit and detecting temperatures of the image sensing optical system by another temperature detector provided in the image sensing optical system;

storing error information of the image sensing element in one memory device provided in the image sensing unit and storing error information of the image sensing optical system into another memory device provided in the image sensing optical system, where the error information in the one memory device includes an adjustment amount of the image sensing element and the error information in the another memory device includes an adjustment amount of the image sensing optical system for a plurality of temperatures; and adjusting a relative position of the image sensing element and the image sensing optical system based on the error information stored at the storing step in the one memory device and stored at the storing step in the another memory device associated with the temperatures of the respective image sensing element and the image sensing optical system detected respectively at the detecting step by the one detector and at the detecting step by the another detector.

* * * * *